(12) United States Patent
Krasadakis

(10) Patent No.: US 10,310,471 B2
(45) Date of Patent: Jun. 4, 2019

(54) CONTENT RECOGNITION AND COMMUNICATION SYSTEM

(71) Applicant: Accenture Global Solutions Limited, Dublin (IE)

(72) Inventor: Georgios Krasadakis, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 129 days.

(21) Appl. No.: 15/445,340

(22) Filed: Feb. 28, 2017

(65) Prior Publication Data

US 2018/0246486 A1   Aug. 30, 2018

(51) Int. Cl.
  *G05B 15/02*  (2006.01)
  *G05B 19/042*  (2006.01)
  (Continued)

(52) U.S. Cl.
  CPC ....... *G05B 19/0426* (2013.01); *G05B 19/048* (2013.01); *G06F 21/6245* (2013.01);
  (Continued)

(58) Field of Classification Search
  CPC ..... G06F 1/163; A61B 5/0022; A61B 5/1118; A61B 5/02055; G05B 2219/2642;
  (Continued)

(56) References Cited

U.S. PATENT DOCUMENTS

| 7,002,463 | B2 * | 2/2006 | Wakabayashi | ..... G08B 21/0423 340/522 |
| 7,068,842 | B2 * | 6/2006 | Liang | .................... A61B 5/1113 348/143 |

(Continued)

FOREIGN PATENT DOCUMENTS

| EP | 2927854 | 10/2015 |
| EP | 3012701 | 4/2016 |

OTHER PUBLICATIONS

CogniPoint™, at least as early as Nov. 10, 2016, pp. 1-2, Point Grab, available at http://www.pointgrab.com/product/.

(Continued)

*Primary Examiner* — Darrin D Dunn
(74) *Attorney, Agent, or Firm* — Brinks Filson & Lione

(57) ABSTRACT

System and methods for processing information acquired from distributed sources are provided. The system may receive activity data samples from a plurality of collectors in a plurality of different independent locations in an organization. The system may identify baseline metrics associated with the activity data samples. The system may perform machine-based recognition of the activity data samples and associate the activity data samples with weight factors. The system may weigh the baseline metrics with the weight factors to generate adjusted metrics. The system may communicate activity information based on a logical combination of the activity data samples, context information recognized in the activity data samples, and metrics related to the activity information. Devices or networks connected with the system may receive and/or query a state of the organization including the activity data samples, context information recognized in the activity data samples, and/or metrics related to the activity information.

14 Claims, 10 Drawing Sheets

(51) Int. Cl.
G06Q 10/06 (2012.01)
G06Q 10/10 (2012.01)
G05B 19/048 (2006.01)
G06F 21/62 (2013.01)
G06F 16/583 (2019.01)
G06F 16/2457 (2019.01)

(52) U.S. Cl.
CPC ............. *G06Q 10/06* (2013.01); *G06Q 10/10* (2013.01); *G05B 2219/24015* (2013.01); *G06F 16/24575* (2019.01); *G06F 16/5854* (2019.01)

(58) Field of Classification Search
CPC .... G05B 19/048; F24F 11/30; H04L 12/2803; H04L 12/2816; G08B 21/0423; G08B 21/0453; G08B 21/0476; G08B 19/00; G08B 21/0446; G08B 21/0492; G06K 2009/00939; G06K 9/00335; G06K 9/00771; G06K 9/0088

See application file for complete search history.

(56) References Cited

U.S. PATENT DOCUMENTS

| | | | | |
|---|---|---|---|---|
| 7,200,266 | B2 * | 4/2007 | Ozer | G06K 9/00335 |
| | | | | 382/100 |
| 7,302,481 | B1 | 11/2007 | Wilson | |
| 7,825,813 | B2 * | 11/2010 | Farhan | G06Q 50/22 |
| | | | | 340/286.07 |
| 7,831,599 | B2 * | 11/2010 | Das | G06F 17/30265 |
| | | | | 382/225 |
| 8,346,691 | B1 * | 1/2013 | Subramanian | G06N 3/08 |
| | | | | 706/12 |
| 8,458,194 | B1 * | 6/2013 | Procopio | G06F 17/30705 |
| | | | | 707/749 |
| 8,655,906 | B1 * | 2/2014 | Kuraoka | G06F 17/30675 |
| | | | | 707/767 |
| 9,278,255 | B2 * | 3/2016 | Cheng | A63B 24/00 |
| 2003/0182282 | A1 * | 9/2003 | Ripley | G06F 17/30477 |
| 2003/0229471 | A1 * | 12/2003 | Guralnik | G06K 9/00496 |
| | | | | 702/182 |
| 2004/0138858 | A1 * | 7/2004 | Carley | H04L 41/142 |
| | | | | 702/186 |
| 2006/0200475 | A1 * | 9/2006 | Das | G06F 17/30256 |
| 2009/0066486 | A1 * | 3/2009 | Kiekbusch | G08B 5/221 |
| | | | | 340/286.02 |
| 2009/0089108 | A1 | 4/2009 | Angell et al. | |
| 2010/0070527 | A1 * | 3/2010 | Chen | G06F 17/30781 |
| | | | | 707/772 |
| 2011/0127973 | A1 * | 6/2011 | Luerkens | H02M 1/38 |
| | | | | 323/235 |
| 2012/0094639 | A1 * | 4/2012 | Carlson | H04W 4/029 |
| | | | | 455/414.1 |
| 2012/0265501 | A1 * | 10/2012 | Goldstein | G06Q 10/04 |
| | | | | 703/2 |
| 2012/0294511 | A1 * | 11/2012 | Datta | G06K 9/00771 |
| | | | | 382/155 |
| 2013/0173062 | A1 | 7/2013 | Koenig-Richardson | |
| 2013/0222133 | A1 | 8/2013 | Schultz et al. | |
| 2015/0269631 | A1 * | 9/2015 | Lin | G06Q 30/0255 |
| | | | | 705/14.66 |
| 2016/0063072 | A1 * | 3/2016 | N | G06F 17/30554 |
| | | | | 707/722 |
| 2016/0119260 | A1 * | 4/2016 | Ghafourifar | H04L 51/066 |
| | | | | 709/206 |
| 2016/0239767 | A1 | 8/2016 | Wewalaarachchi et al. | |
| 2016/0259308 | A1 * | 9/2016 | Fadell | G05B 15/02 |
| 2016/0292157 | A1 | 10/2016 | Zhang et al. | |
| 2017/0006094 | A1 * | 1/2017 | Abou Mahmoud | |
| | | | | H04L 67/1095 |
| 2018/0075491 | A1 * | 3/2018 | Lin | G06Q 30/0255 |
| 2018/0144186 | A1 * | 5/2018 | Wnuk | G06T 11/206 |

OTHER PUBLICATIONS

4 Ways to Make the Smart Building Case to the C-Suite, at least as early as Nov. 8, 2016, pp. 1-7, Buildings, available at https://www.buildings.com/buzz/buildings-buzz/entryid/526/4-ways-to-make-the-smart-building-case-to-the-c-suite.

Smart buildings: How IoT technology aims to add value for real estate companies, at least as early as Nov. 11, 2016, pp. 1-32, Deloitte University Press, available at https://www2.deloitte.com/content/dam/Deloitte/us/Documents/financial-services/us-dup-smart-buildings-how-iot-technology-aims-to-add-value-for-real-estate-companies.pdf.

MCS Smart buildings solution, at least as early as Nov. 11, 2016, p. 1, MSC Solutions, available at https://www.mcssolutions.com/smart-buildings/.

Smart-buildings-context-aware-buildings, at least as early as Nov. 11, 2016, p. 1, ZAN Compute, available at https://zancompute.com/blog/index.php/2016/04/02/smart-buildings-context-aware-buildings/.

Activity-Aware Energy-Efficient Automation of SmartBuildings, at least as early as Nov. 11, 2016, p. 1-17, Energies, available at www.mdpi.com/1996-1073/9/8/624/pdf.

Avolved, at least as early as Nov. 11, 2016, p. 1, Avolved, available at http://www.avolvedbi.com/.

Honeywell Smart Building Score™ Provides Smart Approach to Better Facilities and Business Results, at least as early as Nov. 11, 2016, pp. 1-6, Honeywell, available at http://www.honeywell.com/newsroom/news/2015/10/put-your-building-to-work-honeywel-smart-building-score-provides-smart-approach-to-better-facilities-and-business-results.

Smart Buildings with Internet of Things Technologies, at least as early as Nov. 11, 2016, p. 1, Intel, available at https://www-ssl.intel.com/content/www/us/en/smart-buildings/overview.html.

Extended European Search Report, issued in EP Patent Application No. 18153774.7, dated Apr. 5, 2018, pp. 1-10, European Patent Office, Munich, Germany.

* cited by examiner

CONTENT RECOGNITION AND COMMUNICATION SYSTEM

TECHNICAL FIELD

This disclosure relates to data acquisition systems and, in particular, to acquiring, processing, communicating, and responding to information collected from distributed sources.

BACKGROUND

Present approaches to acquiring, processing, and communicating information from distributed sources lack the ability to meaningfully contextualize information and take actions based on an interpretation of the contextualized information. Technical approaches to data acquisition presently fail to generate meaningful associations between raw data and information represented by the raw data. Further, manual methods of data acquisition fail to meaningfully contextualize concurrent feeds of information acquired from multiple locations and from various sources. The vast number of possible associations between acquired information presents challenges to respond to the information or otherwise provide the information in a meaningful manner. In addition, present approaches suffer from a variety of additional drawbacks, limitations, and disadvantages. There is a need for the inventive systems, apparatuses, and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
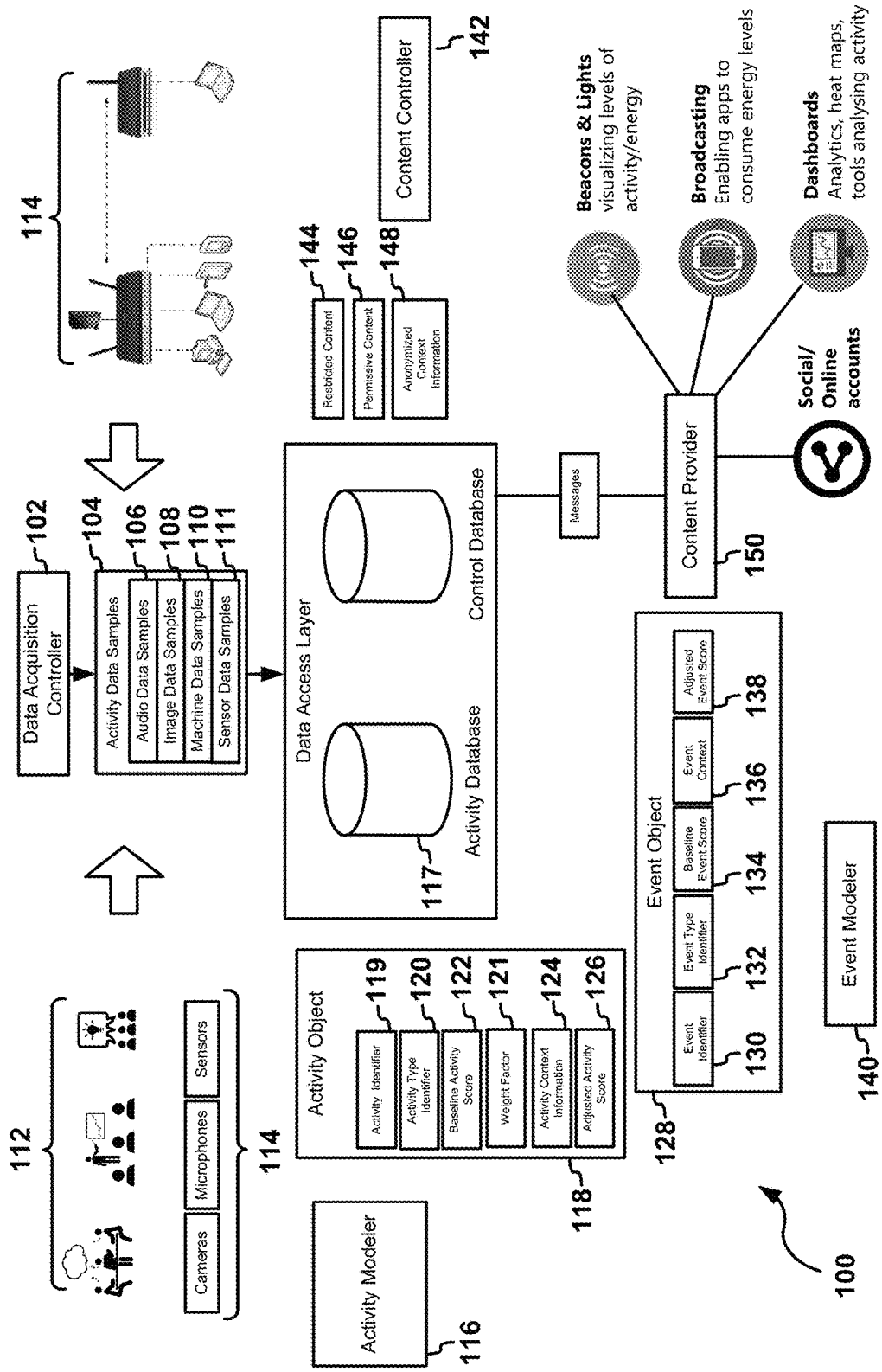
FIG. 1 illustrates an example of a system to disseminate data of an interconnected organization.

By way of an introductory example, the system may include a data acquisition controller circuitry to receive, from a plurality of collectors in a plurality of different independent locations in an organization, activity data samples. The activity data samples may include audio data, image data, and machine data. The system may further include activity type classifier circuitry. The activity type classifier circuitry may search a memory configured to store previously classified activity data samples associated with baseline activity scores. In addition, the activity type classifier circuitry may identify a baseline activity score for the activity data samples based on a comparison between the activity data samples and the stored previously classified activity data samples. Further, the activity type classification circuitry may link, in the memory, the baseline activity score with the activity data samples.

The system may further include content recognition circuitry. The content recognition circuitry may recognize activity context information in the activity data samples. In addition, the content recognition circuitry may search a memory configured to store an association between previously classified activity context information and predefined weight factors and/or other metadata. Further, the content recognition circuitry may identify a weight factor based on a comparison between the activity context information and the previously classified activity context information.

The system many additionally include activity scoring circuitry. The activity scoring circuitry may be configured to weight the baseline activity score with the weight factor to generate an adjusted activity score corresponding to the activity data samples. In addition, the system may include content controller circuitry. The content controller circuitry may match the activity context information with restricted information stored in a memory and generate modified activity context information, which excludes the restricted information.

The system may also include event modeler circuitry. The event modeler circuitry may calculate a variance score based on a comparison between the baseline activity score and the adjusted activity score. Furthermore, the system may include content provider circuitry. The content provider circuitry may communicate a message including at least one of the modified activity context information, the variance score, or the adjusted activity score.

One interesting feature of the systems and methods described below may be that a state of an organization, such as a building, may be queried and/or communicated. For example, activity information of an organization acquired through audio, video, and machine communication may be contextualized with scores and organized in application programming interfaces. Alternatively, or in addition, an interesting feature of the systems and methods described below may be that the system may select certain activity information based on the scores and organize the activity information in a message according to a predefined template. Alternative or additional features are described herein.

FIG. 1 illustrates an example of a system 100 to disseminate data of an interconnected organization. The system 100 may include a data acquisition controller 102. The data acquisition controller 102 may receive activity data samples 104 including audio data samples 106, image data samples 108, and machine data samples 110. The data acquisition controller 102 may receive the activity data samples 104 from a plurality of data collectors 114 in a plurality of different independent locations 112 in an organization.

The system 100 may continuously process the feed of the activity data samples 104. The feed of the activity data samples 104 may be analyzed against maintained knowledge bases enabling the system to recognize activities occurring in the organization through image recognition, audio recognition, and/or other forms of data recognition. The system 100 may score the significance of the activity data samples 104. Thus, the system 100 may organize the activity data samples 104 into meaningful data structures, contextualize the activity data samples 104 by comparing the activity data samples 104 with other known information about the organization, determine a relative importance of the content included in one or more of the activity data samples 104, apply security measures to the activity data samples 104 and/or communicate meaningful information related to the activity data samples 104 in real time, or near real time as the activity data samples 104 are collected. Alternatively or in addition, the system 100 may expose the activity data samples 104 and information related to the activity data samples 104 through an application programming interface (API).

The activity data samples 104 may include any type of information indicative of activity occurring in an organization. Activity may include the actions, identities, and status of people and/or machines within the organization. For example, activity may include people walking into a room, people speaking, a computer performing operations, or any other information related to the state of the organization.

The activity data samples 104 may be information acquired during and/or in response to the activity. The activity data samples 104 may include packetized information, digital signals, analog signals, or any other form of information. In example systems, the activity data samples 104 may include the audio data 106, the image data 108, the machine data 110, and/or the sensor data 111. The audio data 106 may include audio collected from the data collectors 114 in the organization. For example, the audio data 106 may include audio collected from microphones or any other devices capable of capturing audio. The image data 108 may include still frame images and/or video. For example, the image data 108 may be collected from a camera or any other type of device capable of collecting images or video.

In some examples, the activity data samples 104 may include information acquired from human activity detected by the data collectors 114. For example, the activity data samples may include information indicative of human actions, identities, and/or status that occurring within the organization. Thus, for example, the activity data may include audio and/or images of human actions, identities, and/or status. Alternatively or in addition, the activity data samples may include information indicative of machine activity.

The machine data 110 may include information generated by machines in the organization. Machines may include workstation computers, local area networks, switches, routers, mobile phones, or any other machine used in an organization. In some examples, the machine data samples 110 may include information generated by software, for example an operating system, executing on the operating systems. Thus, by way of non-limiting examples, the machine information may include CPU utilization, LAN utilization, energy consumed, user login/logout events, and any other type of information related to the machine. In other examples, machine data samples may also include information from, and/or related to, robot activity, virtual reality device usage, augmented reality device usage, laptops, smartphones, public screens, content presented on public screens, content accessed, internal corporate portal activity and content request summaries—including, for example, keywords contextual information and document exchange. In other examples, the machine data may include an indication of an occurrence of a predetermined type of activity. For example, machine data may include, for example, doors usage, such as doors opening and closing, ventilation system usage, such as HVAC systems turning on and off, elevator usage, the on/off of lights, room occupancy status (i.e. occupied, unoccupied, and number of occupants). The sensor data 111 may include any other activity detected The sensor data samples 111 may include information acquired from sensors located in the organization. The sensor data samples 111 may include the pre-processed information such as audio video and images. The sensor data samples 111 may include sensor metadata corresponding to the pre-processed information, such as the time, the location, and/or the quality of the information acquired by the sensors The data collectors 114 may be positioned in different independent locations 112 in an organization. The data collectors 114 may include any device capable of capturing information. For example, the data collectors may include an analog and/or digital sensor. The data collectors 114 may include any device capable capturing audio, photos, videos, location, temperature and/or any other type of information. In some example, the data collectors 114 may include physical devices positioned within the plurality of different independent locations. Alternatively or in addition, the data collectors 114 may include hardware and/or software on a machine, for example a PC, Laptop, router, or any other type of machine describe herein. In addition, the data collectors 114 may provide analog and/or digital data to the data acquisition controller 102. In some examples, the data collectors 114 may include contextual information with the activity data samples 104. For example, the data collectors 114 may provide information related to a unique identifier of the data collector, a location of the data collector, a time that information was acquired, a type of data collector, and any other information related to the data collector.

The plurality of the different independent locations 112 may include physical areas within the organization. For example, the physical locations may include meeting spaces, hallways, recreational areas, offices, public areas, or any other type of physical space in an organization. The organization may include the locations where individuals and/or machines conduct related activities. In some examples, the organization may include a building and/or plurality of buildings. Alternatively or in addition, the organization may be distributed across multiple geographic areas.

Accordingly, the data acquisition controller 102 may collect the activity data samples 104 from the data collectors 114 positioned in the different independent locations 112 within the organization. The system 100 may include an activity data modeler 116 to process the activity data samples 104, organize the activity data samples 104 into meaningful data structures, associate contextual information with the activity data samples 104, and perform any other operations related to the activity data samples 104 as described herein. The activity data modeler 116 may receive the activity data samples 104 from the data acquisition controller 102, from an activity database 117, and/or directly from the data collectors 114.

The activity data modeler 116 may generate and/or identify an activity object 118. The activity object 118 may include and/or be associated with an activity identifier 119, an activity type identifier 120, a baseline activity score 122, activity context information 124, an adjusted activity score 126, and any other information related to the activity data samples 104. Thus, the activity object 118 may be representative of all of the information associated with an activity represented through the activity data samples 102. The activity object 118 may be stored in memory. Alternatively or in addition, the activity object 118 may include one or more tables in a database configured to store the activity object 118. For example, the activity object 118 may be stored in the activity database 117 and/or communicated to the various components described herein.

The activity data modeler 116 may generate the activity type identifier 120 for the activity data samples. The activity type identifier 120 may include an identification of qualified activity types that occur in the organization. The activity types may include any type of activity that can occur in the organization in either physical spaces or virtual spaces. For example, the activity types may include, a person walking into a room, the occurrence of a meeting, a person logging into a workstation, CPU utilization on a work station, network traffic, and/or any other classification of activity that occurs in physical space and/or virtual space. The activity type identifier 120 may uniquely identify the activity type.

The activity type identifier 120 may be stored in a memory, for example the activity database 117, and associated with the activity data samples 104. Associations between the activity data samples and activity type identifiers may occur through statistical analysis and data modeling. In some examples, the activity type identifier 120 may be associated with activity data samples that originated from a plurality of data collectors configured to receive various formats of data. For example, a data collector configured to sense light may determine that the lights in the room are turned on. In addition, a data collector configured to sense motion may determine that a person has entered the room. The activity database 117 may store an association between an activity type identifier indicative of "a person entering a room" with the activity data samples 102 from the data collector configured to sense light and the data collector configured to sense motion. When new activity data samples are received from the data collectors 114, the new activity data samples may be compared with previously associated activity data samples to determine the activity type identifier for the new activity data samples.

The activity modeler 116 may determine energy metrics that quantify the significance of activities identified through the activity data samples 102. For example, the baseline-activity score 122 may quantify the significance of the activity type to the organization. The significance of the activity type to the organization may reflect, for example, the value of the activity type, the importance of the activity type, and/or any other interest the organization has in the activity type. The baseline activity score 122 may be pre-determined and created/adjusted from input of a user of the system. Alternatively or in addition, the baseline activity score 122 may be adjusted based on the time of the day that the activity type occurs, the frequency of the activity type, the location where the activity type is occurring and/or other information associated with the activity data samples 102.

In addition, activity modeler 116 may perform content understanding, enabled via voice recognition, face recognition, or any other form of content recognition. The activity data modeler may determine activity context information 124 included in the activity data samples 102. The activity context information 124 may include content represented in the activity data samples 102. For example, the activity context information 124 may include identified people, objects, trade symbols or logos, moods, expressions, topics of discussions, words, written information, movement types, patterns and/or any other identifiable information. Alternatively or in addition, the activity context information 124 may include information related to the generation of the activity data samples 104. For example, the activity context information 124 may include the location where the activity data samples 104 were collected, the time that the activity data samples 104 were collected, a data collector id corresponding to the data collector that captured the activity data samples 104, or any other information that describes the activity data samples 102.

The adjusted activity score 126 may include an energy metric reflecting a significance of the activity type identifier adjusted to account for other information related to the activity data samples 102. For example, the adjusted activity score 126 may include the baseline event score 122 adjusted for the significance of the activity context information 126. For example, the adjusted activity score for a meeting (the activity type identifier 120) including low level employees (the activity context information 126) on the first floor of the organization (the activity context information 126) may have a lower adjusted activity score than a meeting (the activity type identifier 120) with high-level executives (the activity context information 124) occurring on the top floor of the organization (the activity context information) 124. In some examples, the adjusted activity score 126 may be calculated by weighting the baseline activity scores associated with the activity types with the weight factors associated with the context information.

The activity context information 124 may be associated with a weight factor 121. The weight factor 121 may include energy metric quantitative of the significance of the activity context information 124. The significance of the activity context information 124 may include, for example, the value of the activity context information 124 to the organization, the importance of activity context information 124, and/or any other interest the organization has in the activity context information 124.

An association between the weight factors and the context information (weight factor association) may be established. For example, the activity database 117 may include the weight factor association and the weight factor association may be a tabular relationship in a database. In other examples, the weight factor association may be a data structure in a memory, a relationship in a markup language, or any other form of association. In addition, the weight factor association may be predetermined. For example, a system user may establish the weight factor association. For example, the system user may determine that information collected outside business hours is not as relevant as information collected during business hours. Thus, the system user may established that the weight factor association for context information collected at night and a weight factor association for context information collected during the day.

In addition to managing the activity object 118, the system may further manage an event object 128. The event object 128 may include, or be associated with, any information acquired, created, and/or managed by the system related to an event. An event may include any group of related activities in an organization. Examples of the events may include a meeting, a presentation, a client demo, an ad-hoc un-registered arrangement of people or any other planned or unplanned collection of related activities. The events may be predefined for each of the activity types and/or groups of activity types. For instance, a meeting may be expected to be accompanied by certain activity type (entering a room, exiting the room, talking, presenting, handshaking etc.) and certain activity contexts associated with the event (i.e. the identifies of certain attendees, content of the conversations discussed, etc).

The event object 128 may include and/or be associated with an event identifier 130, at least one event type identifier 132, a baseline event score 134, event context information 136, an adjusted activity score 126, and any other information related to the activity data samples 104. Thus, the event object 118 may be representative of all of the information associated with the event. The event object 128 may include data stored in memory. Alternatively or in addition, the event object 128 may include one or more tables in a database configured to store the information of the event object 118. For example, the event object 118 may be stored in the activity database 117 and/or communicated to the various components described herein.

An event modeler may acquire, create, identify, or otherwise manage the information of the event object 128. The event modeler 140 may associate the event object 128 with the type event identifier 132. The event identifier 130 may include a unique identifier, such as a primary key any other type of unique identification mechanism. In some examples, the event modeler may associate activity objects with the event object 128.

The baseline event score 134 may include an energy metric included and/or associated with the event object 128. The baseline event score 134 may include energy metrics that are representative of a significance of the event to the organization. In some examples, the baseline event score 134 may be predetermined and/or configured by the user of the system. Alternatively, the baseline event score 134 may be calculated based on an aggregate calculation of the baseline activity scores associated with activity objects. Alternatively or in addition, the baseline event score 134 may be defined by energy metrics associated with information in the energy context 136.

The event context 136 may include information such as organization-specific metadata related the event. In some examples, the event context 136 may include predefined event information. The predefined event information may originate from the user of the system and may include expected information about the event, for example, an expected number of participants to a meeting, an expected time of the event, an expected location of the event, energy level and/or any other information about the event. Alternatively or in addition, the event context 136 may include information from a plurality of activity contexts associated with the event. For example, the event context 136 may include particular keywords/products mentioned, participants of the meeting, topics discussed etc.

The event modeler 140 may determine the adjusted event score 138. The adjusted event score 138 may include energy metrics that quantify a variance between an expected significance of the event and the actual significance of the event. For example, the baseline event score 138 may be compared with respective adjusted activity scores of the activity identifiers to determine the adjusted event score 138. Alternatively or in addition, the adjusted event score 138 may be a function of weighting each baseline activity scores included in the activity objects associated with the event object 128.

The event modeler 140 may apply the special event criteria to the energy metrics of the event object 128 to determine if the event qualifies as a special event. A special event includes an event of heightened importance based on the variance between the expected significance of the event and the actual significance of the event. Alternatively or in addition, a special event may be defined by an energy metric exceeding a predefined threshold. For example, the event modeler 140 may determine that an energy metric exceeds the predefined threshold. Alternatively or in addition, the special event criteria may include score ranges. Each of the score ranges may be indicative of a level of significance. The event modeler 140 may compare the energy metric with the score ranges to determine a degree of significance of the event (i.e. somewhat important, very important, etc). In other examples, the special event criteria may include predefined rules to determining the level of significance. The predefined rules may include rules that establish the level of significance based in information included in the event object 128 and/or the activity object 118. For example, the predefined rules may include a rule that if an agreement in a meeting is reached, the event object 128 shall be flagged as a special event.

In addition to organizing the activity data samples into the activity object 118 and the event object 128, the system may implement security measures to ensure that sensitive information of the organization is not communicated. The system 100 may include a content controller 142. The content controller 142 may determine whether organization information is private. Private information includes the organization information that should not be shared by the system. The content controller 142 may maintain a restricted content repository 144 and a permissive content repository 146. The restricted content repository 144 may include restricted information that has been reserved as private and/or confidential. The permissive content repository 146 may include permissive information reserved as not private. The context controller 142 may compare the organization information with the information in the restricted content repository 144 and the permissive content repository 146 to determine if and how to present the information. The organization information may include any of the types of information disclosed herein, for example any information included or associated with the activity object 118 and/or the event object 128. The terms permissive content may be used interchangeably with whitelisted content or whitelisted information. In addition, the terms restricted content or may be used interchangeable with blacklisted content or blacklisted information.

In some examples, the content controller 142 may modify and/or anonymize the organization information to generate modified organization information which is safe to communicate/share with a wider audience. For example, the content controller 142 may match the activity context information 124 with information in the restricted content repository 144 and modify the activity context information 124 to generate anonymized context information 148 which excludes the information in the restricted content repository 144. A variety of examples exist where the content controller may modify the organization information to generate the anonymized context information. The content controller 142 may, for example, modify a photo of a dry-erase board to remove sensitive writing on the dry erase board. The content controller 142 may modify information including product information, such as a product name, where the product information is modified and/or removed. The content controller 142 may remove and/or alter particular logos and/or symbols from images. The content controller 142 may remove and/or anonymize faces in a photo.

In some examples, the content controller 142 may remove, and/or anonymize faces which are identifiable in an image. Alternatively or in addition, the content controller may crop a photo and/or apply filters to make sure that there are no identifiable faces in the image. The content controller 142 may compare the faces with the information contained in the permissive content repository 146 and/or restricted content repository 144. Alternatively or in addition, the content controller 142 may evaluate the activity context data associated with the image to determine if the face in an image should be removed and/or anonymized. While the previous example applies to faces, the anonymization based on restricted content, permissive content, and activity context information may equally apply to particular voices, logos, symbols, discussions of organization projects, competitor names, product information, and/or any other organization information recognized in audio and/or video data.

In other examples, the anonymized context information 148 may include products information, such as a product name, where the product information is removed, The content controller 142 may apply key word searches to determine if organization information is private or non-private. For example, the restricted content 144 may include words, phrases, products, and/or groups of characters that have been reserved as private. Similarly the permissive content repository 146 may include words, phrases, and/or groups of characters that have been reserved as non-private. The content controller 142 may perform key-word searches, including Full text search on the organization information to determine if the organization information includes any information included in the backlist 144 and/or the white list 146. In other examples, the restricted content 144 and/or the permissive content 146 may include data patterns, images, audio clips and/or any other form of information that may be compared to determine if the organization information is private or public.

The restricted content repository 144 and/or the permissive content repository 146 may include any source of information. Thus the restricted content repository and/or the permissive content repository 146 may include an API call, a database, a memory location, a data feed, and/or any other source of information.

Using the data structures and analytics described herein for managing the activity data samples, the system 100 may communicate organization information generated from the activity data samples 104. For example, the system may include a content provider 150. The content provider 150 may package the organization information, including the activity objects, event objects, activity data samples, or any other information described herein, in a meaningful manner.

Activity information, as described herein, means the activity data samples 104 and any information generated from the activity samples, such as the activity object 118 and/or the event object 128. In addition, the activity information may include organization information. Organization information may include entities, objects, people, documents, texts, conversations, products, or any other information and/or article of information recognized from the activity data samples 104.

The energy metrics, as described herein, means any quantitative value assigned to activity information to contextualize the significance of the activity information. Energy metrics may include baseline scores, adjusted scores, weight factors, or any other type of metric. For example, the energy metrics may include the baseline activity score 122, the adjusted activity score 126, the baseline event score 134, the adjusted event score 138, the weight factor 121. In addition, the energy metrics may include any additional metrics, such as the energy score of multiple events. The word "score" is synonymous with metric. In some examples, the energy metrics may be defined on a non-zero scale of 0 through 10. In other examples, the energy metrics may include numeral scales, ordinary scales such as human readable levels of business energy, and/or estimation based fit of particular statistical distributions.

The "significance" or "significancy" of activity information means or reflects the relative importance, value, relevance, and/or other interest the organization has in the activity information. The significance of the activity information may be quantified through the energy metrics. In some examples, the energy metrics may be defined by the user of the system 100. Alternatively, the energy metrics may be assigned based on statistical trends and patterns in the activity data samples 102, the time of day the activity data samples 104 were collected, the location of the data collectors that generate the activity data samples 104, and any other attribute of activity information, as described herein.

The activity data samples 104 may be analyzed and the activity information may be generated based on the activity data samples 104. The system 100 may create associations, links, and/or assignments between sets of the activity information. As described herein, a first information may be linked, associated, and/or assigned with a second information when a data structure of the first information includes a reference to the second information. Thus, for example, the first information may be a table with a foreign key that identifies the second information. Alternatively or in addition, the first information may include a pointer, or another identifier of a memory location of the second information. In other examples, the first information may include a hyperlink, internet-protocol address, and/or another network identifier of the second information. In an additional example, the first information may be object in an object oriented language and the second information may be included in the attributes of the object. Thus, the link, association, and/or assignment between the first information and the second information include any reference to the second information by the first information, and/or vice versa.

Figure 2:
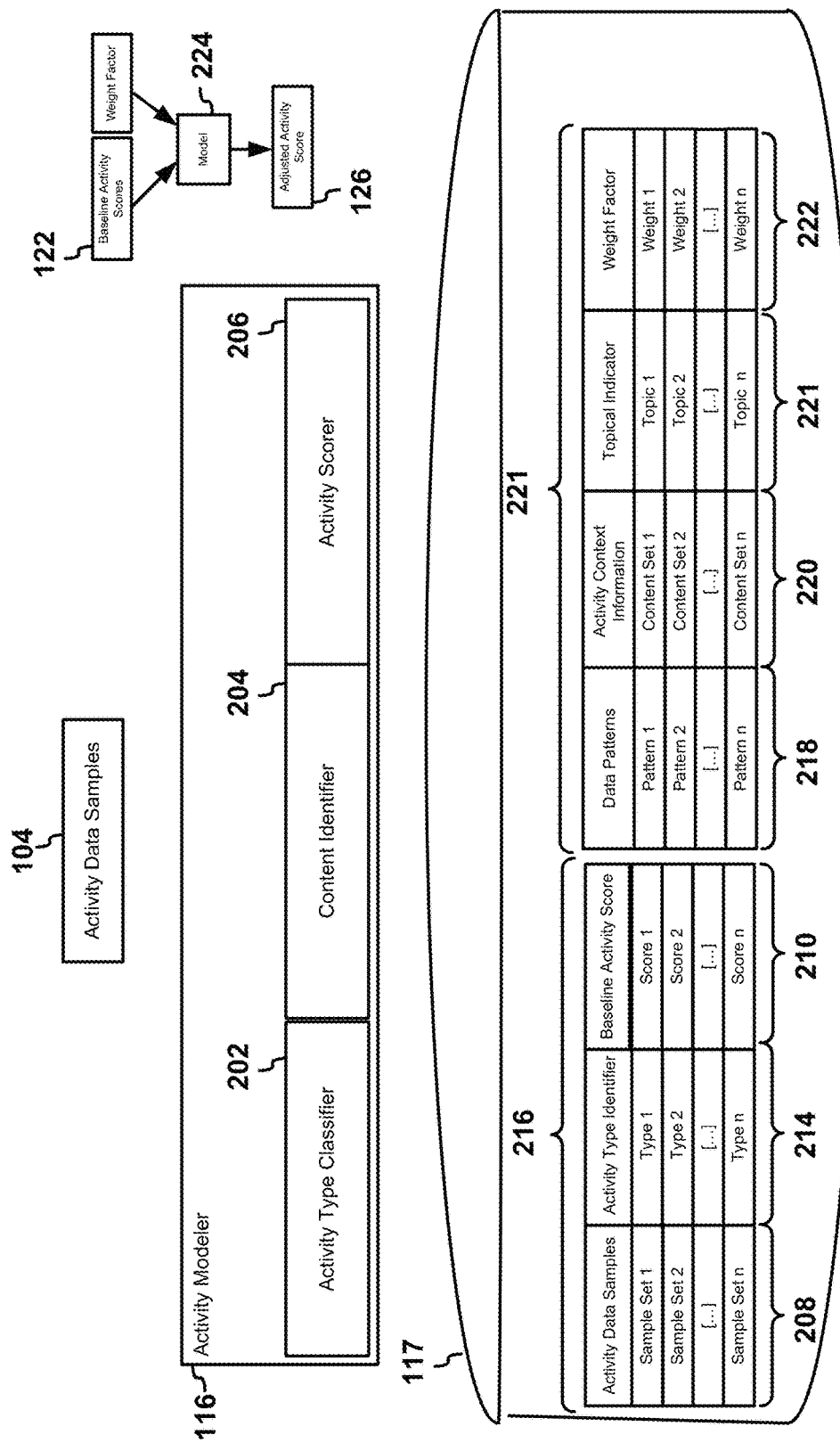
FIG. 2 illustrates an example of an activity modeler.

FIG. 2 illustrates an example of the activity modeler 116. The activity data modeler 116 may include an activity type classifier 202, a content recognizer 204 and an activity scorer 206.

The activity type classifier 202 may search a memory configured to store previously classified activity data samples 208 associated with baseline activity scores 210 and identify a baseline activity score 122 for the activity data samples 104 based on a comparison between the activity data samples 104 and the previously classified activity data samples 208. For example, the activity data samples 104 may include sample sets. Each of the sample sets may be groups of the activity data samples 104 that are grouped by a differentiator, such as a time each sample set was acquired, a location that each sample set was acquired, the data collector that acquired the sample set, or any other type of attribute descriptive of the activity data samples 104. The activity type classifier may classify each of the sample sets of the activity data samples 104 with a corresponding baseline activity score in the baseline activity scores 210.

In some examples, the activity type classifier 202 may associate the activity data samples 104 with the activity type identifier 120. For example, the activity type classifier 202 may classify the activity data samples 104 with the activity type identifier 120 by searching a memory configured to store previously classified activity data samples 208 associated with activity type identifiers 214 and comparing the activity data samples 120 with the previously classified activity data samples 208. The activity type identifiers 214 may be associated with the baseline activity scores 210. Accordingly, by identifying the activity type 120, the activity type classifier may additionally identify the baseline activity score 122. The activity type classifier may store an association 216 between the activity data samples 104, the baseline activity score 122 and/or the activity type identifier 120. For example, the association may include the activity object 118, as described herein.

The content recognizer 204 may perform content recognition on the activity data samples 104 to determine the activity context information 124 included in the activity data samples 104. For example, the content recognizer 204 may be configured to recognize data patterns 218 in the activity data samples 104 and identify the activity context information 124 associated with the data patterns 218. In some examples, the content recognizer 204 may include audio recognition algorithms, image recognition algorithms, and/or video recognition algorithms. For example, the content recognizer 204 may include a speech-to-text processor and an image recognition processor. Examples of the speech-to-text processor may include hidden markov models, neural networks, deep learning, and any other speech-to-text process known in the art. Examples of image recognition processors may include Kernel PCA, latent semantic analysis, partial least squares, principal component analysis, multifactor dimensionality reduction, nonlinear dimensionality reduction, multi-linear principal component analysis, or any other image recognition process known in the art.

The content recognizer 204 may search a memory configured to store an association 221 between the previously recognized activity context information 220, weight factors 222 and/or the data patterns 218. The content recognizer 204 may identify the weight factor 121 for the activity data samples 104 based on a comparison between the previously recognized activity context information 220 and the activity context information 124 of the activity data samples 104. Alternatively or in addition, the data patterns 218 may be associated with the weight factors and the content recognizer 204 may identify the weight factor for the activity data samples 104 when the data patterns 218 are identified. The content recognizer may link the weight factor with the activity context information 124, the activity data samples 104, the activity object 118, and/or any other information included in the activity database 117.

The content recognizer 204 may also identify a topical indicator included in the activity data samples 104. The topical indicator may include a classification of content included in activity data samples 104. For example, the topical indicator may include terminality, concepts, symbols, or any other information that is relevant to the organization and/or conveys meaning. In additional examples, the activity data samples 104 and/or the activity context information 124 used to form the topic indicators include content and document access, meeting agenda and meeting minutes, words captured in meeting rooms, content presented, content consumed by public displays, explicitly set topics and more. The topical indicator may be associated with the weight factor 121. Thus the weight factor 121 may describe a significance of the topical indicator to the organization. Alternatively or in addition, the topical indicator may be associated with an activity object 118, and/or any other form of activity information.

The content recognizer may apply statistical models, machine learning, and other algorithms to identify the topical indicator. For example, the content recognizer may compare the data patterns in the activity data samples 104 with the previously classified data patterns 218 stored in the memory. The previously classified data patterns 218 are associated with previously classified topical indicators 221. Thus the content recognizer may match the data patterns in the activity data 104 samples with the previously classified data patterns 218 to determine one or more topical indicators representative of the activity data samples 104.

Alternatively or in addition, the content recognizer 204 may determine the topical indicator directly from the activity context information 124. For example, the content recognizer 204 may identify the topical indicator in a repository, such as the activity database 117. The repository may include blacklisted topical indicators. The blacklisted topical indicator may include topical indicators that have been identified as private and/or confidential. The blacklisted topical indicators may be linked, in the repository, with blacklisted activity content information. The content recognizer 204 may anonymize the activity context information 124 in response to the topical indicator being included in the repository. Accordingly, the content recognizer 204 may generate the modified activity context information 148 which excludes the restricted context information.

The activity scorer 206 may determine metrics that quantify the significance of an activity to the organization. For example, the activity scorer 206 may determine an activity score that quantifies the significance of the activity data samples 104 to the organization. In some examples, the activity scorer 206 may include the baseline activity score 122 and/or the adjusted activity score 126. For example, the activity scorer 206 may calculate the adjusted activity score 126 by weighing the baseline activity score 122 with the weight factor 121 to generate the adjusted activity score 126. The weight factor 121 may be multiplied with the baseline activity score 122 to determine the adjusted activity score 126. Alternatively or in addition, the weight factor 121 may be applied in a model 224, for example a statistical model, mathematical model, and/or algorithm to determine the adjusted activity score 126.

Figure 3:
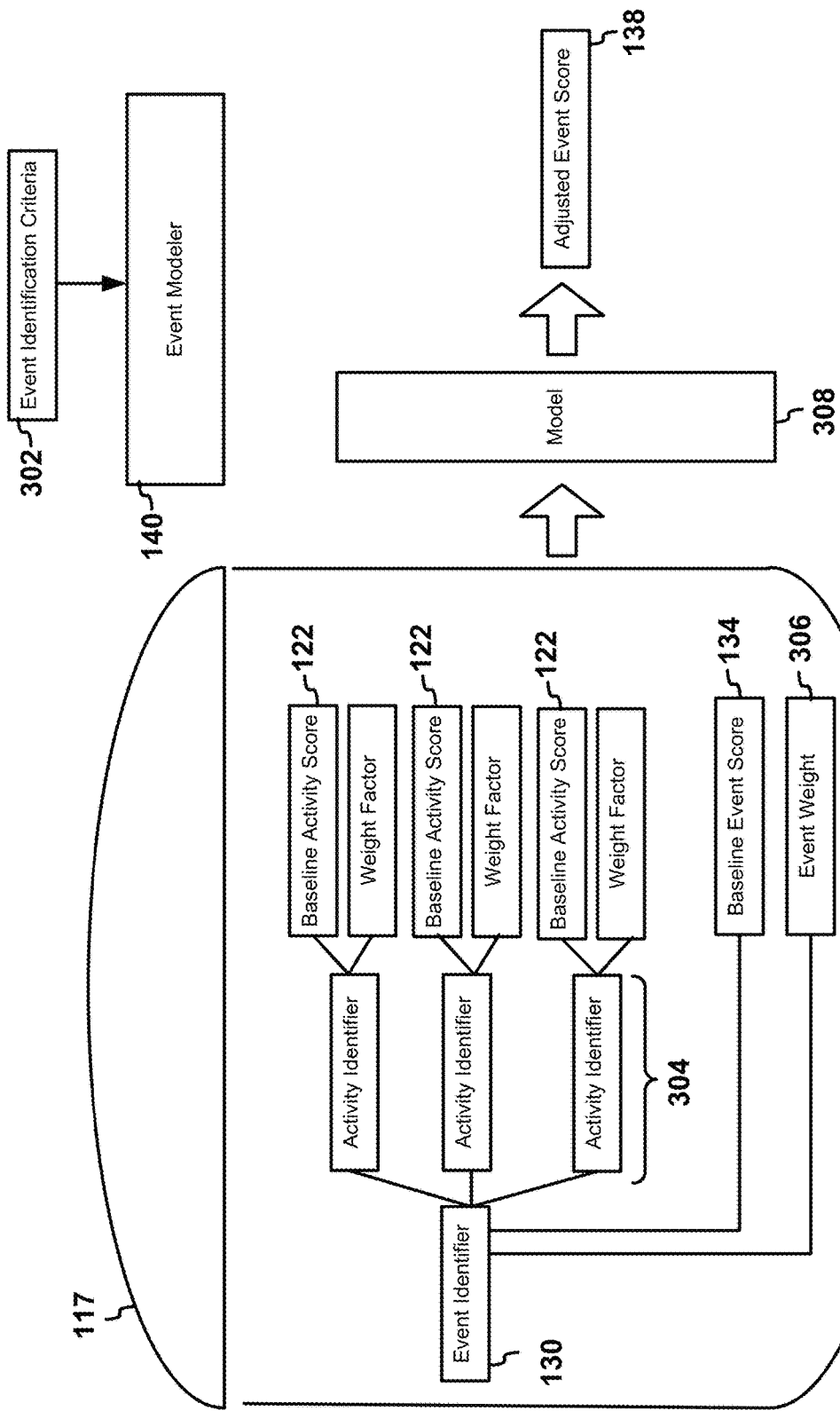
FIG. 3 illustrates an example of an event modeler.

FIG. 3 illustrates an example of the event modeler 140. The event modeler 140 may receive an event identification criteria 302. The event identification criteria 302 may include attributes that identify an event. The event identification criteria 302 may include any information that identifies an event in the organization. For example, the event identification criteria 302 may include a time interval, a location and/or group of locations, an area, topics, words, identified people, the event context information, the activity context information, and/or any other information that may accompany an event in the organization or otherwise stored in the activity database 117. The event modeler 140 may generate the event object based 128 based on the event identification criteria 302. Alternatively or in addition, the event modeler 140 may determine all the event objects that satisfy the event identification criteria 302. For example, the event modeler may generate and or search for the event identifier 130.

As an example of how the event modeler 140 may respond to the event identification criteria 302, the event modeler 140 may receive a range of time. The event molder 140 may identify a plurality of baseline activity scores generated from the activity data samples 104 created by the plurality of data collectors over the range of time. In addition, the event modeler 140 may identify a plurality of adjusted activity scores generated from the activity data samples 104 created by the plurality of data collectors 114 over the range of time. With this information, the event modeler 140 may calculate a variance score, or any other energy metric described herein, based on a comparison of the plurality of adjusted activity scores and the plurality of baseline activity scores.

In some examples, the event identifier 130 may be associated with related activity identifiers 304. The related activity identifiers 304 may be identified based on the event identification criteria 302. For example, the event search criteria may identify the activity context information 124, the activity type identifiers 120, and/or any other information included and/or associated with the activity object 118. The event modeler may determine all of the related activity identifiers 304 based on the event search criteria 302. In addition, the event modeler 140 may associate the related activity identifiers 304, and/or any other information in the activity object 118, with the event identifier 130 and/or the event object 128. For example, the event modeler 140 may collect the activity context information 124 associated with all of the related activity identifiers 304 and generate the event context 136.

The event modeler 140 may generate an event score. The event score may include an energy metric that quantifies the significance of the event to the organization. The event score may include the baseline event score 134 and/or the adjusted event score 138. The baseline event score 134 may include a metric of the expected significance of the event to the organization. For example, the baseline event score 134 may be associated with the event type identifier 132. Alternatively, the baseline event score 134 may be specified as an attribute by the user of the system, for example in the event identification criteria 302 when the event identifier 130 was generated. In some examples, the baseline event score 134 may include an aggregation of the baseline activity scores. For example, the baseline event score 134 may be an average of the baseline activity scores associated with the event identifier 130.

The event modeler 140 may determine the adjusted event score 138. For example, the event identifier 130 may be associated with an event weight 306. The event weight 306 may be supplied by the user of the system and associated with the event identifier 130 by the event modeler 140. Alternatively, the event weight 306 may be an aggregate of the weight factors of the related activity identifiers 304. The event modeler 140 may apply an event scoring model 308 to the baseline event score 134 and/or the event weight 306. For example, the event modeler 140 may multiply the event weight 304 with the baseline event score 134 to determine the adjusted event score 138. Alternatively or in addition, the event weight may include.

The event modeler 140 may determine an energy level for a group of events. The energy level may be metric that quantifies the significance of a group of events and/or activities to the organization. Thus, the energy level may include the activity scores and/or the event scores as described herein. For example, the event modeler 140 may aggregate multiple events identifiers in order to compute an overall energy score as a function of the estimated event scores of each particular event identified. Each of the event identifiers may be associated with the event weight 306 which can be used in the computation. The energy level may be calculated according to the following model:

$$\frac{100}{RE} * \left( \sum_{i=1}^{n} w_i EE_i + \sum_{j=1}^{m} EA_j \right) = \frac{100}{RE} * \left( \sum_{i=1}^{n} w_i \sum_{k=1}^{K_i} EA_k + \sum_{j=1}^{m} EA_j \right)$$

Where $EE_i$ is the energy level for the Event i and $EA_j$ is the energy level for the Activity j all happening within a particular time frame; $w_i$ is a weight applied to the event; RE is the contextual maximum level of energy for the particular building for the same time frame. The contextual maximum refers to a seasonally adjusted, possibly corporation-wide or even industry-wide baseline allowing the expression of the energy levels of a particular time frame, as relative number.

While the activity object 118 and the event object 118 provide examples of how to organize the data activity samples, additional organization schemes and data structures may exist for activity information and energy metrics.

The system 100 may further organize, format and communicate the activity information to other systems.

Figure 4:
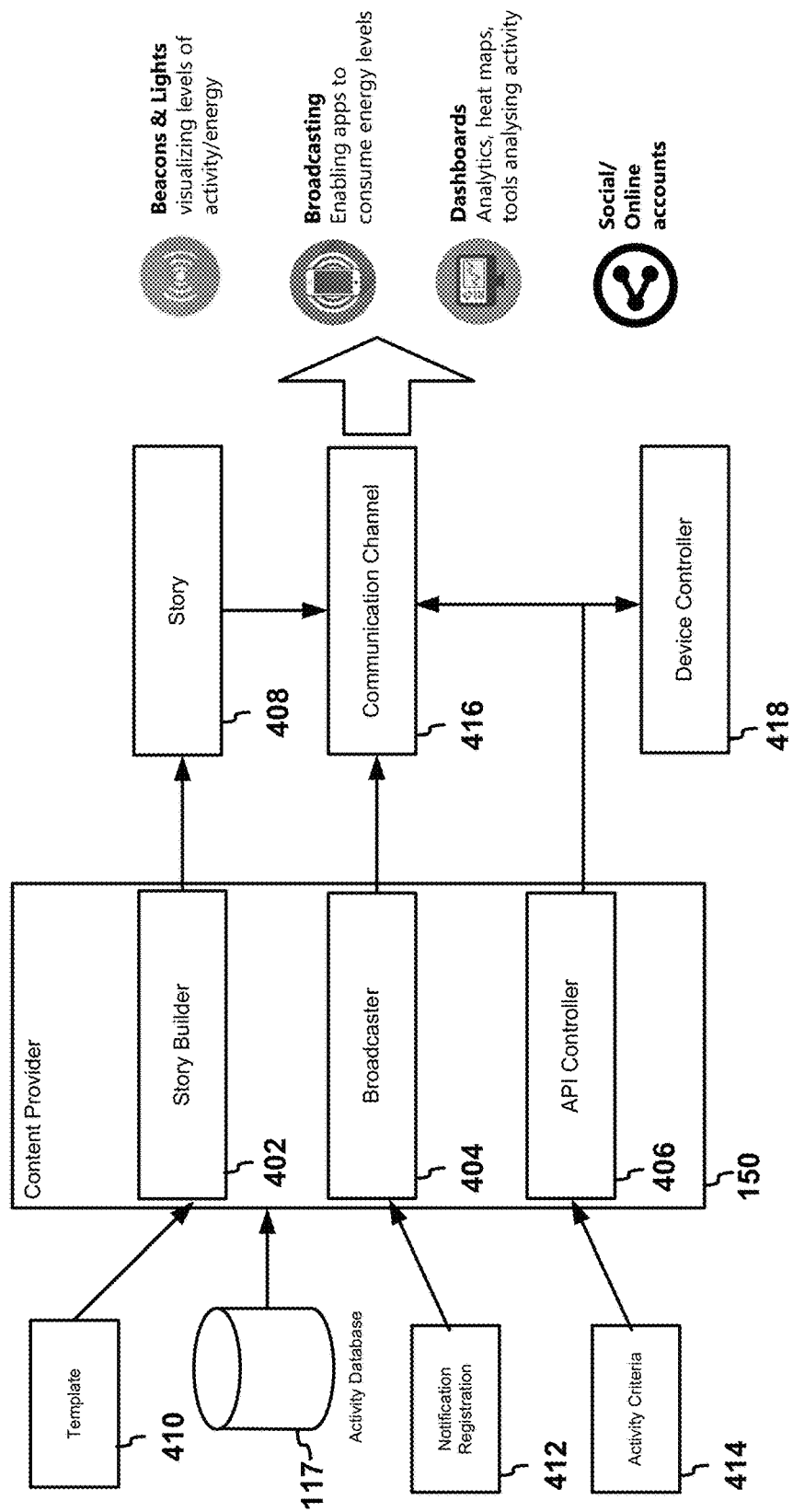
FIG. 4 illustrates an example of a content provider.

FIG. 4 illustrates an example of the content provider 150. The content provider 150 may include a story builder 402, a broadcaster 404, and an API controller 406. The story builder 402 may synthesize a story 408 based on a templates 410. A trigger to the compile the story 408 may be based on logic (rules) which can identify special moments in terms of the energy metrics. For example, if the activity information includes an unusual concentration of people in a particular space in the organization and/or certain movement patterns, the story builder 402 may generate the story 408 to describe the activity information related to the movement patterns. In other examples, the story builder 402 may generate the story 408 in response to the event identifier 130 being flagged as a special event. For example, the story builder 402 may generate the story 408 in response to the energy metric being greater than a predefined threshold. The predefined threshold may be specified by the user of the system and/or through the API controller 406.

When a special case/situation is identified, the story builder 402 may capture additional activity data samples 104 through the data collectors 114, such as, for example, panoramic photos, photos with particular perspective, audio and/or any other detailed data about the situation and the progress. Alternatively or in addition, the story builder 402 may acquire additional data from the activity database 117, such as, for example, the information of the activity object 118 and/or the event object 128. All information used by the story builder 402 may be controlled by the content controller 142, as described herein. Thus, the story builder 402 may generate stories that include information that has been anonymized. Alternatively or in addition, the story builder 402 may only generate stories that include information that is white-listed.

The story 408 may include text, images, and/or videos that summarize the activity information. The story 408 may include activity information over a particular time frame (a day, week, month etc.) and/or particular areas in the organization. Alternatively or in addition, the story 408 may summarize the activity information based on activity context information. For example, the stories 408 may summarize a recent visit from a CEO at a particular branch of the organization and all the meetings the CEO attended at the branch. The story 408 may include comparative information. For example, the story may compare what the organization was doing this week vs same week last year. Alternatively or in addition, the story 408 may include comparisons between industries, the market, global trends etc. They story might also include specific 'activity moments' photos or an automatically selected photo (i.e. from a pool of pre-approved imagery).

In some examples, the story may include content arranged based on the activity metrics. For example, video content from the activity data samples may be associated with an activity metric. The video content may be included in the story in response to the activity metric being above a predefined threshold. Alternatively or in addition, audio, text content from the activity data samples may be included in the story in a similar manner. Accordingly, audio, image, and text data may be associated with an activity metric and selected for the story based on the activity metrics. In some examples, the content of the story may be selected based on a score range, For example, the story builder 402 may select content in response to the activity metric associated with the content being within the score range.

The story builder 402 may generate the story 408 using a template 410. The template 410 may include a structured set of predefined information. For example, the template 410 may include information formatted in a predefined format. The predefine format may control how content is arranged in information created with the template 410. The template 410 may include text, images, video and/or other information and/or combination therein. The template 410 may include at least one data field where variable content is added. The data field may include a placeholder for the variable content. For example, the data field may be adjacent to predefined content in the template. The variable content may include the activity information. For example, the variable content may include text, images, videos, and/or any other information included in the activity context. Thus, the story builder may populate the data field of the template 410 with information from the data samples, information of the activity object 118, information of the event object 128, and/or any activity information.

The story builder 402 may select the template 410 from a plurality of templates based on the activity metrics. For example, each of the plurality of templates may be associated with a corresponding score range. The story builder 402 may select the template 410 from the plurality of templates, in response to the adjusted activity score being within the corresponding score range of the template. In other examples, the system 100 may identify a trend in the activity metrics. The story builder 402 may select the template in response to the trend of the activity data samples matching a predefined trend associated with the template 410.

In some examples, the template 410 may be used to create videos. For example, the datafield may include frames of the video. The predefined format of the template 410 may include predefined video frames before and/or after each datafield included in the template 410. In other examples, the template 410 may include audio messages where the datafield may include clips in the audio message. The predefined format of the template 410 for the audio message may define the audio content before and/or after one or more datafields in the template 410. In further examples, the template may include images. The predefined formation of the template 410 may define image content surrounding each of the data fields, which may include respective portions of the image. The data field of the template 410 may be associated with predefined metrics. The variable content for the data field may selected based on a comparison of the predefine metrics and the activity metrics associated with the variable content. For example, the datafield may be associated with a score range and video information from the activity data samples may be associated with an activity metric. The story builder may select the video information in response to the activity metric being within the score range. In other examples, the story builder may select the video information, or other variable content, in response to the activity metric being above a predefined threshold.

In some examples, the system 100 may include multiple templates. Each template may be associated with a particular use-case. For example, the system may include individual templates corresponding to respective social media accounts. The story builder 402 may determine the appropriate template for each use-case.

The system 100 may include the broadcaster 404 to expose the state of the organization. The broadcaster 404 may communicate activity information and/or the stories 408 via a communication channel 416, for example email and/or social/collaboration tools. In some examples, the broadcaster 404 may automatically identify the communication channel 416 based on the topical indicators and/or other information included in activity information. The communication channel may include any method, destination, and/or combination thereof for communicating information. For example the communication channel 412 may include web addresses, social media accounts, email, instant messages, API hooks, and/or any destination and/or mode of communication.

The broadcaster 404 may use the activity information to frequently communicate the status of the organization to a set of connected client applications on a schedule, ad-hoc, and/or triggered basis. For example, the broadcaster 404 may determine that energy metric is greater than a predefined threshold. The broadcaster may communicate the story 408 in response to the energy metric being greater than the predefined threshold.

The broadcaster 404 may also autonomously decide when, what, and where to share the state of the organization. For example, the broadcaster 404 may decide that a particular moment in a meeting room (a moment of excitement about a major business achievement) may be suitable for sharing within the corporation through special channels (e.g. yammer accounts, email distribution lists etc.). In another example, the broadcaster 404 may decide that the story 408 is suitable for the public domain, and thus posts the story 408 to major corporate social media accounts. In another example, the broadcaster 404 may monitor the energy metrics in order to identify peak moments of activity in the organization and, if there is one, automatically communicate white-listed information being discussed.

The broadcaster 404 may identify trends in the energy metrics and communicate activity information associated with the energy metrics. For example, the broadcaster 404 may compare the trend of adjusted activity scores associated with an activity identifier to predefined trends. The predefined trends may be linked with predefined templates. The broadcaster 404 may identify a template from the predefined templates based on a comparison of the trend with the predefined trends. A trend in the energy metrics may include any trend identifiable by statistical analysis. In some examples, the trend of the energy metric may occur on in an adjusted time series from activity data samples collected at and whitelisted places of the organization. Positive peaks and outliers in the energy metrics may also indicate a trend.

In some examples, a client application may be connected to the system 100 through a standard authentication process. As soon as the device is authenticated and subscribed to a broadcasting list the broadcaster 404 may communicate activity information. Each device is then responsible to use this status—for example via suitable visualization, notifications, alerts etc.

In some examples, the broadcaster 404 and/or the broadcasting list may be configured with notification registration 412. The notification registration 412 may include rules for communicating activity information. For example, the notification registration 412 may include rules for communicating the activity information. For example, the notification registration 412 may include a rule to communicate the activity information in response to the energy metric exceeding a predefined threshold. Alternatively or in addition, the notification registration 412 may include a rule to communicate the activity information in response to content recognized in the activity data samples 104. Alternatively, the notification registration 412 may include rules to communicate the activity information at specific times of day and/or via specific communication channels. For example, the notification registration 412 may include rules to communicate the story 408 to a particular social media account using a particular template.

In some examples, the notification registration 412 may include an association between certain kinds of the activity information and at least one communication channel 416. For example, the certain kinds of activity information may be associated with the communication channel 416 in the notification registration 412. Thus, for example, a set of subscribers may register to receive notifications that include updates based on activity data samples received that relate to the activity type identifier 120, the activity context information 124, the activity scores, the event type identifier 132, and/or any other activity information.

In an example, the notification registration 412 may include a requested topical indicator and a requested template identifier. In response to the notification registration 412, the broadcaster 404 may establish a rule to broadcast any information associated with requested topical indicator using the requested template. Accordingly, the broadcaster 404 may identify the template 410 in response to an identifier of the template 410 matching the requested template identifier. The broadcaster 404 may further format the activity information descriptive of the activity data according to the template 410 to generate formatted activity information, as described herein. Finally, the broadcaster 404 may communicate the formatted activity information in response to the requested topical indicator of the notification registration being included in the topical indicators generated from the activity data samples 104.

In another example, the notification registration may define a requested predefined threshold. In response, the broadcaster 404 may only communicate activity information associated with an energy metric that exceeds the predefined threshold. In another example, the notification registration may further include a requested communication channel identifier. In response, the broadcaster 404 may select the communication channel 416 having the communication identifier from a group of communication channels.

The API controller 406 may provide the activity information following specific protocols and/or procedures. In some examples, the API controller 406 may provide the activity information such that the activity information may be displayed in a particular manner. In one example, the API controller 406 may provide the activity information according to a protocol that will allow the activity information may be displayed on a 'live' dashboard presenting the activity information in terms of particular key performance indicators (KPIS), time series, events, facts. This dashboard can be connected to the organization—consuming a particular feed of metrics and KPIs. For example the dash board may display any information included in the activity object 118 and/or the event object 128.

The API controller 406 may provide specific activity information. For example, the API controller may provide the energy metrics and activity information associated with the energy metrics. In one example, the API controller may provide the adjusted activity score and location identifiers of the data collectors 114 that created the activity data samples 114 that were used to generate the adjusted activity score 126. In other examples, the API controller may associate any kind of energy metric with any information about the associated activity data samples 114, such as the areas, rooms, times, and/or any other contextual information of the data collectors 114 that generated the activity data samples 114.

The activity information may be displayed as a heat-map visual representation of the activity information. For example, the heat map may visually display the energy metrics distributed throughout the different individual locations 112 of the organization. In some examples, the heap map may display activity and/or energy scores corresponding to the activity data samples collected in particular locations of the organization. For example, levels of intensity of lighting equipment, internal or external to the organization, may be collected as the activity data samples 104. The energy metrics may be generated from the activity data samples 104 and displayed on the heat map of the organization. For example, messages communicated by the content provider 150 may be responsive by a display interface to display the heat map. The heat map may include a graphical representation of the plurality of different independent locations marked with colors. Each of the colors may correspond to a unique energy metric, such as the adjusted activity score 126.

The heat map is one example of visualizations of the activity information that may be generated by the system 100 and/or made available through the API controller 406. Other examples may include the communication of data over social media accounts, graphs, newsletters, updates, reports, or any other form of visualizing information.

The API controller 406 may expose one or more Application Programing Interfaces (APIs) to enable the organization and/or external systems to discover the activity information. The APIs may be grouped as public and private. The API controller 406 may expose APIs to acquire the current state of the organization in terms of the event metrics described herein.

In some examples, the API controller 406 may receive activity criteria 414. The API controller 406 may provide specific activity information in response to the activity criteria 414. The activity criteria 414 may include time series parameters, topical indicator parameters, energy metric parameters, location parameters or any other parameters that indicate how to search for information created in the system and/or stored in the activity database 117. For example, the API controller 406 may provide activity information associated with energy metrics in a specific score range in response to the activity criteria 414 including the specific score range. In another example, the API controller may receive a location parameter indicative of the at least one of the plurality of independent locations 112 and communicate the adjusted activity score 126 in response to the location parameter matching the identifier of the at least one of the plurality of independent locations 112. The API controller 406 may also expose the ability to search for activity information based on inter-day energy metrics, time series, comparative time series, topical indicators created within a predefined time range, inter-day topical indicators, time series of topical indicators, and any other search criteria that could indicate information, or ranges of information, included in the activity information and/or generated by the data collectors 114.

Figure 5:
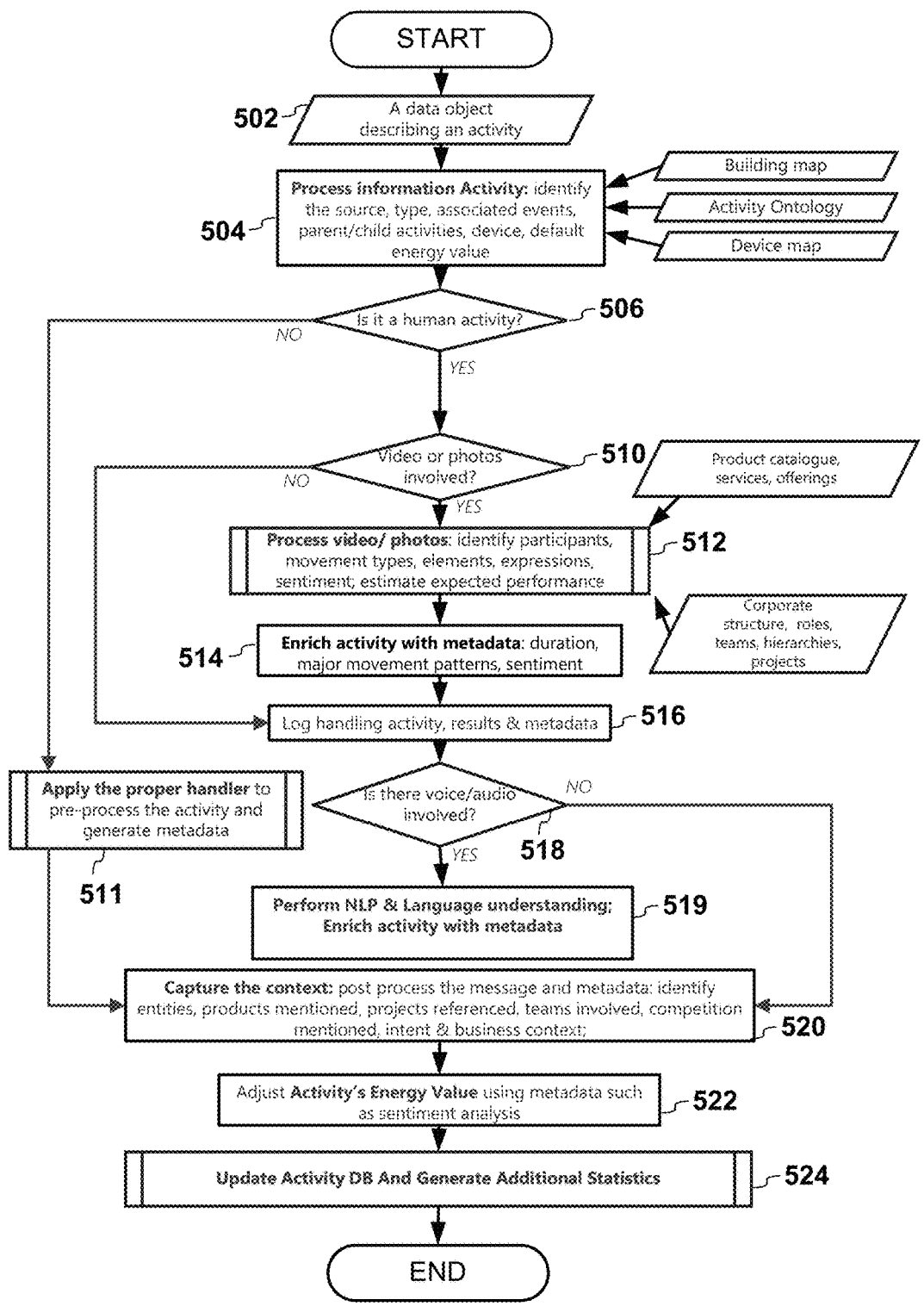
FIG. 5 illustrates an example of a flow diagram of an activity modeler.

The system 100 may further include a device controller. The device controller 418 may control one or more hardware devices in the organization based on the energy metrics. For example, the device controller 418 may control lights, HVAC equipment, computers, network equipment, door locks, or any other type of hardware device in the organization. In some examples, the device controller 418 may identify and/or receive trends in the energy metrics and control the hardware devices based on the trends. For example, the device controller 418 may detect relatively low energy metrics over a time frame and turn off the lights of a building. In other examples, the device controller 418 may control the hardware devices in separate locations in the organization based on the energy metrics detected in each location. For example, the device controller 418 may lower the air conditioning in parts of a building with relatively lower energy metrics. The device controller 418 may receive information from the API controller 406 to control any aspect of the organization based on the energy metrics. FIG. 5 illustrates an example of a flow diagram of the activity modeler 140. The flow diagram illustrated in FIG. 5 represents logic to process any activity captured from data collectors within the organization, (cameras, motion sensors, beacons, microphones, PCs, laptops, projectors and any other device able to autonomously report its activity). The system 100 receives the activity data samples 104 and packages them into a standardized wrapper object—a package encapsulating the original activity (502). This standard wrapper object may include, for example, the activity object. Examples of the original activity may include a particular action such as a person entering a meeting room or a sample of a continuous activity such as a random or sequential sample of an ongoing meeting. The activity object may contain additional metadata about the activity (source device, timestamps, security information etc.). This metadata may include the activity context information, the activity type identifier, or any additional data as described herein.

The system 100 may associate the activity object with the activity identifier. The system 100 may process the activity object by identifying the type of the device that acquired the activity data samples, the location within the organization of the data collector, and associated event objects. In addition, the system 100 may identify if the activity object is part of a group of activities objects. The system 100 may load the baseline energy score and any other information associated with the activity object. (504).

The flow diagram illustrated in FIG. 5 is representative of on a high-level classification between human and machine activity because machine activity (PC/Server/Laptop utilization, network bandwidth, moving devices identification etc.) is more structured while human activity needs advanced analysis, such as Neuro-Linguistic Programming (NLP), video processing, image/photo processing, facial recognition, motion pattern identification, and other forms of recognition algorithms.

The system 100 may determine if the original activity comes from a human (for example an employee being tracked to entering a room) (504). If the original activity represents human activity (506), the system 100 may apply additional processing to the activity object 118 in order to decide the exact processing needed (for instance if video/photo/voice is available etc.) (510). If the original activity comes from machine activity, then the system 100 may apply the proper handler to pre-process the machine data. (511)

The system 100 may apply computer vision algorithms targeting the identification of employees, team arrangement, movement patterns, expressions etc. (512). The outcome of this process may include metadata, such as, for example, identified/named entities, particular employees, identified teams. For example, given that employees x1, x2, x3 were at the meeting the system 100 may determine the existence of a marketing meeting, identified products/services, projects. The system 100 may generate scores quantifying the captured activity (sentiment scores, movement versus similar activities etc.). The activity object 118 may be enriched with the metadata 514 by generating associations, as described herein. The results may then be captured into the log data store for further analysis and post-processing. (516).

The system 100 may determine if audio/video is included in this particular original activity (518). The system 100 may perform NLP in order to understand the activity by performing entity identification in order to identify who is talking on what subject and how relevant is this with the business context of the particular corporation, the implied intent and other indications of significance (519). The output of this process may include a second set of metadata describing the extracted context: a set of identified (mentioned) entities (employees, teams, products, services, competitors, projects, technologies etc.); sentiment analysis outcome etc. The second set of metadata may be included in the activity object 118.

In the next step (520), the system 100 may use the metadata generated by particular processors, for example a voice processor, a photo/video processor, and/or a machine processor, in order to capture the exact business context. Thereafter, the system 100 may adjust the default adjusted energy value and generate an adjusted energy value (AEV) (based on the particular employees identified, the sentiment analysis outcome, the particular project and its importance etc.) (522) For instance, the default energy value may be adjusted based on a highly tensed moment with the CEO present, regarding a very important product of the company versus a cool moment with business analysts discussing about improving an internal process. The system 100 may automatically uses pre-defined weight factors to boost the default AEV based on the importance of its components and the sentiment levels identified. The activity database may then be updated with the default energy values, adjusted energy values, and all the additional information generated by this process and/or included in the activity object. (524). Additional statistics may be generated based on the adjusted energy value. For example, the activity's Adjusted AEV may be compared with baselines for similar activities. Alternatively or in addition, relative scores against the expected value may be calculated and the activity may be flagged as below normal, normal, above normal or an outlier. All metadata, statistics generated, additional flagged information may be updated in the database.

At the end of the process the activity object may be populated with all the metadata required in order to be used as part of the event object 128.

Figure 6:
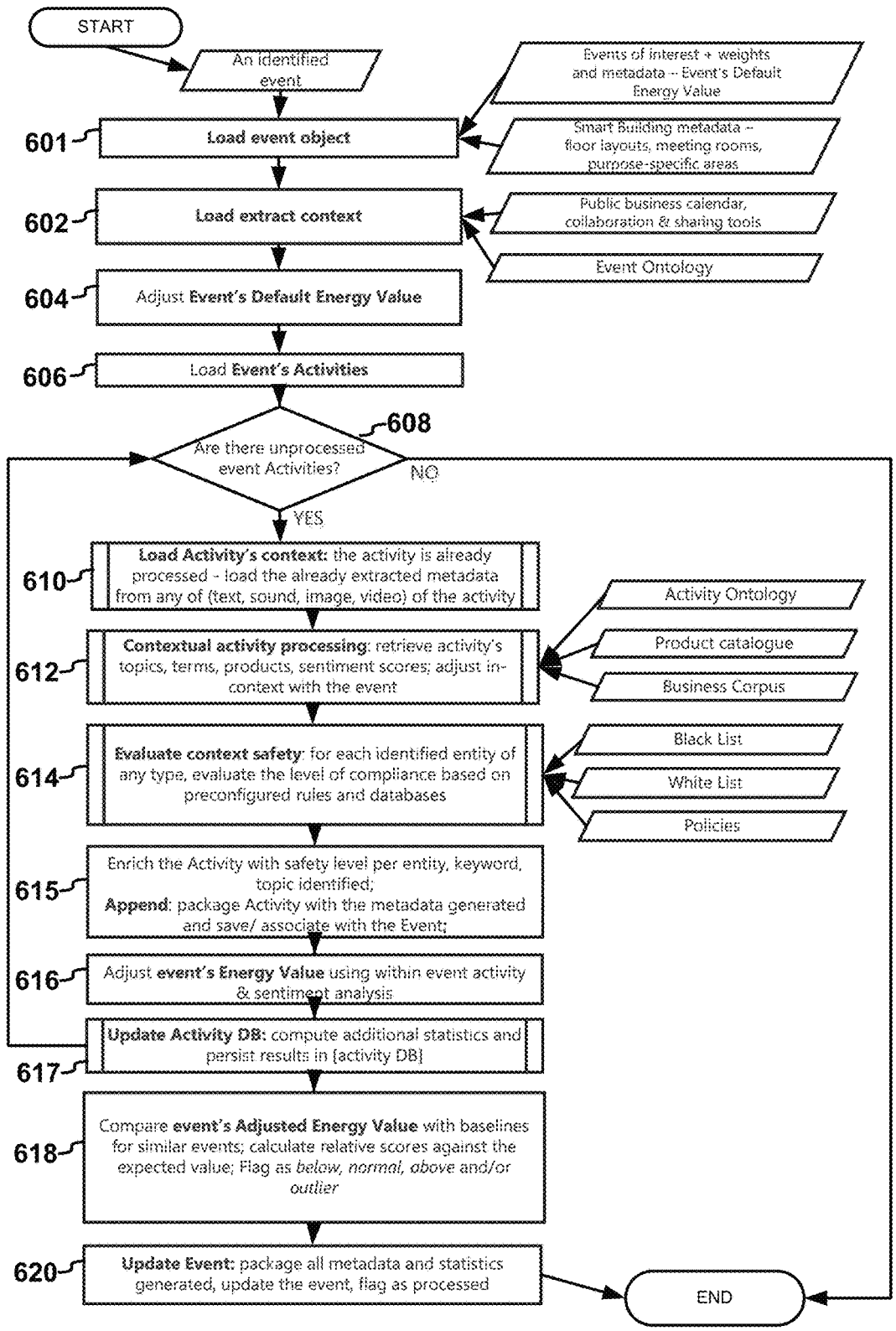
FIG. 6 illustrates an example of a flow diagram of an event modeler.

FIG. 6 illustrates an example of a flow diagram of the event modeler 140. The system 100 may load the event object (601) and all data associated and/or included in the event object. The event type, for instance a meeting, may be associated with a particular default energy value. When the event is more accurately identified (for example, a senior leadership meeting) its importance may be increased and result in the adjusted energy value of the event.

The system 100 may load the event context (602). The event context may include, for example, the location of the event, the type of the physical space, the identified purpose of the event, the participants, the agenda covered, duration etc. Alternatively or in addition, the event context, may include activities associated with the event. The system 100 may use a time frame the exact location and the activities happened in this time & space arrangement. The time frame may be known if the event was schedule. From all matching activities, the system 100 matches those who are relevant to the particular type of event.

The event's default energy value may be adjusted (604). For example, the event may be associated with a default energy value based the event type. The event context may be associated with weights that may be used to adjust the default energy value.

The system 100 may then proceed to build and augment the event object. For example, the system 100 may load the activity objects associated with the event object. (606). This may occur by searching a database for all of the activity objects that include and/or associated with a specific set of activity data samples that satisfy the search criteria. The search criteria may include a set of activity samples generated over a predefined time range, by specific data collectors, at specific locations in the organization, and/or any other additional criteria descriptive of the activity data samples.

The system 100 may proceed to process each activity object and/or the activity data samples until there is no additional information that satisfies the search criteria (608). For example, the system 100 may load the context information associated with the activity object, including the already extracted metadata from the activity data samples. (610). The system 100 may process the activity object by evaluating topics, terms, and additional information such as products and sentiments identified in the activity context information. In addition, while generating the event object, the system 100 may calculate the adjusted activity score for each activity associated with the event object.

The system 100 may evaluate the safety of the activity object. (612) For example, the system 100 may identify entities in the activity context information. Alternatively, the entities may have been previously identified by the activity modeler. The entities may specific items of content, such as products, people, or other identified objects. The system 100 may compare the identified entities with preconfigured rules in a database. Alternatively or in addition, the system 100 may compare the activity context information with information included in a permissive content repository and/or a restricted content repository.

The system 100 may enrich the safety level of each activity object and package each activity object with the event object. (614). For example, the system 100 may flag activity context information as confidential in response to the restricted content repository including the activity context information. Alternatively or in addition, the system 100 may flag the activity context information as white listed in response to the permissive content repository including the activity context information. The system 100 may associate and/or include each activity object identified in this process with the event object.

The system 100 may update the activity object with the updated safety information and additional metadata form the event (616). For example, the system 100 may then store any changes that were made to the activity object during the event analysis. For example, if the activity context information in the activity object was flagged based with safety indicators, as previously discussed, the system 100 may update a database configured to store the activity data object with the safety indicators. In addition, the system 100 may associate the activity object with the event object. For example, the system 100 may associate the activity identifier with the event identifier.

The system 100 may adjust the event's energy value using the event activity and sentiment analysis (617). For example, the baseline activity score and the weight factor of each activity object may be aggregated to adjust the energy value of the event object. Alternatively or in additionally, sentiment analysis may be used to adjust the event object's energy value. The system 100 may determine the emotional state of an event, such as a meeting, based on the facial expressions, movement patterns, audio analysis and language used by the participate. The emotional state may include a metric that quantifies emotional state on numeral scales, ordinary scales such as human readable levels of business energy, and/or estimation based fit of particular statistical distributions.

The system 100 may then compare the event's energy value with comparable events. (618). For example, the system 100 may compare the adjusted activity scores a first event object with the adjusted activity score of a second event object. The second event object may be identified by comparing the event type, the baseline activity score, and/or the event context. In other examples, the location of the events may be compared, the time of the events may be compared, the expected attendees of the events may be compared, the subject of the events may be compared, and/or any other information associated with the event object.

The system 100 may store the event object and associations between the event object and the activity objects in a database (620). The associations between event objects and activity objects may include, for example, associations between tables in a database. Thus, for example, the event object may include a table in a database and the activity object may include a table in a database. The event object and the activity object may be associated by primary keys. In other example, the event object and the activity object may be data structures in any memory where an association between the locations in the memory may be made.

Figure 7:
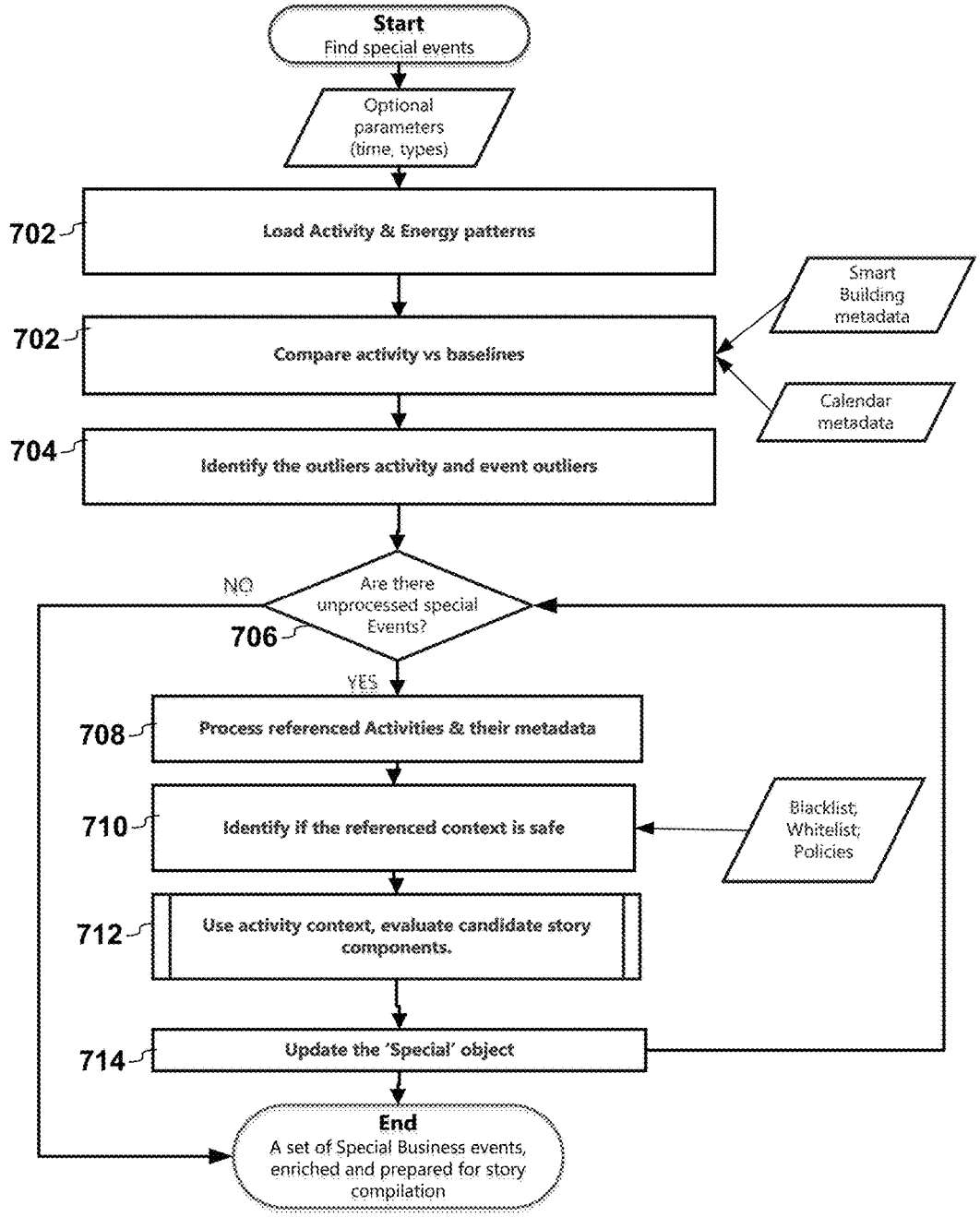
FIG. 7 illustrates a second example of a flow diagram of an event modeler.

FIG. 7 illustrates a second example of a flow diagram of the event modeler 140. In this example, system 100 may detect activity and energy patterns in the activity database. For example, the system 100 may query the activity data for recent patterns, metrics, scores, energy levels.

The system 100 may the compare the baseline energy metrics with adjusted energy metrics (702). For example, the system 100 may analyze expected versus actual energy metrics. In some examples, the comparison may occur on seasonally adjusted time series in particular named events and whitelisted places of the organization. Positive peaks and outliers in the energy metrics may indicate a special event. In some example, the system 100 may compare the baseline activity scores with the adjusted activity scores to determine activity variance scores. Alternatively or in addition, the system 100 may augment baseline event scores with the adjusted activity scores.

The system 100 may determine outliers in the activities and/or the events. (704). For example, the system 100 may apply a predefined threshold value on energy levels for the activities matching a time interval. This creates a shortlist of positive outlier activity objects. The shortlist of outlier activity objects may be associated with an event object. Since the activity objects may be flagged as outlier activities, the event object may be flagged as an outlier. An event object flagged as an outlier may be indicative of a special event in the organization.

The system 100 may further process all of the event objects that have been flagged as outliers (706). The system 100 may load the activity context information of the activity objects flagged (708). For example, the system 100 may identify starts, peaks, end of the special event. The system 100 may flag activity context information as rich data that may be used to generate a story based on the activity scores.

Alternatively or in addition, the system 100 may flag the activity data samples associated with activity object as rich data.

The system 100 may identify if the activity context information has been identified as safe (710). For example, the activity object and/or the activity context information may include safety indicators that may be set based on comparisons of the activity context information with information stored in the black list database and the white list database. The system 100 may use safety indicators to determine if the activity context information is safe and the type of access allowed (team/corporate/public etc.).

The system 100 may further use the activity context information, the activity scores, and addition information included with the activity object to generate story components (712). For example, the system 100 may load the flagged rich data (voice, images, video, text) associated with the activities of the event identified; evaluate safe topics, and/or evaluate expected performance of images, identify best parts of videos.

The system 100 may update the event object that has been identified as a special event with the flagged rich data. (714). For example, the system 100 may register the event object flagged as an outlier and associate the identified outlier activity objects, flags, annotations, expected performance, title alternatives, safety levels, with the event object.

Figure 8:
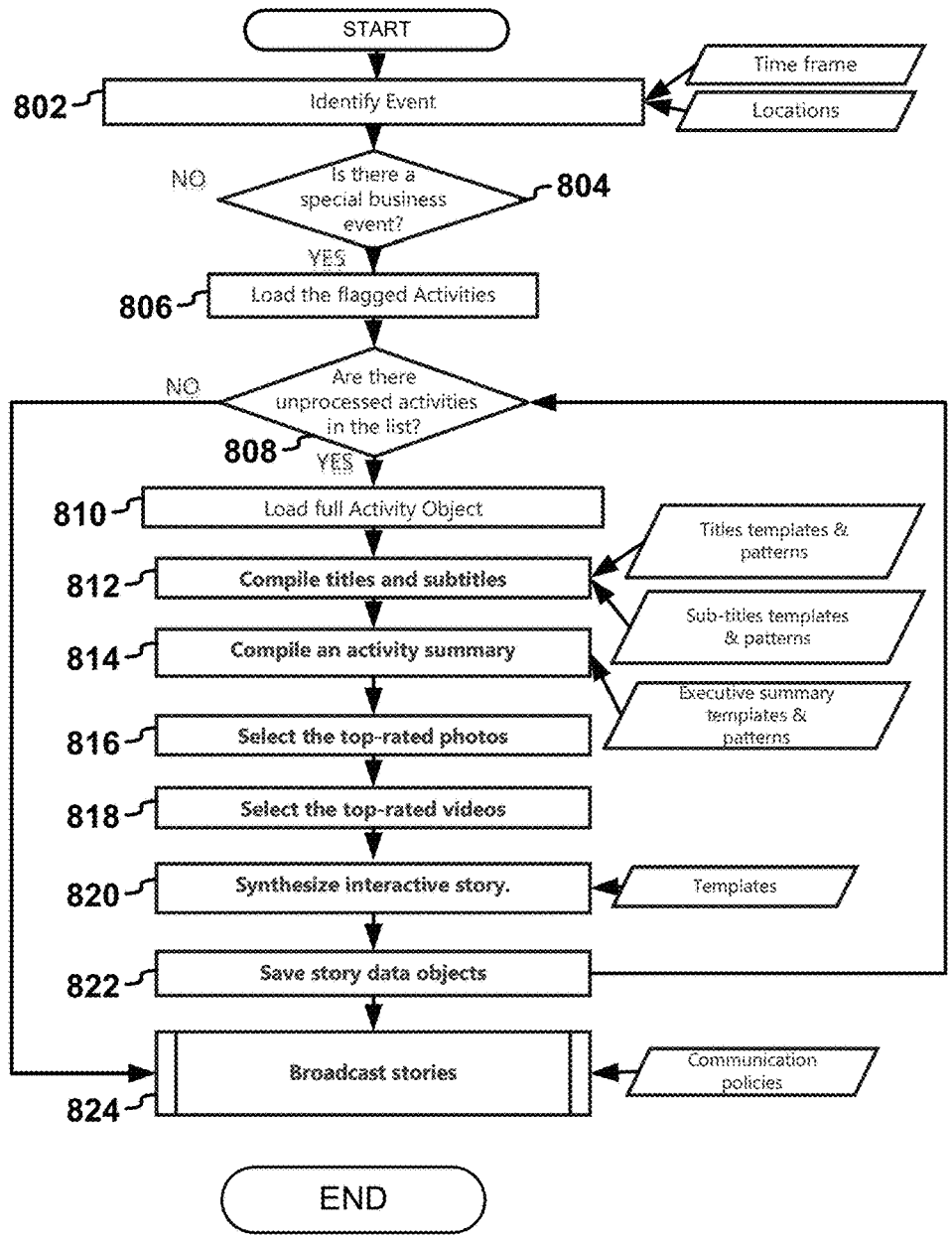
FIG. 8 illustrates an example of a flow diagram of the content provider.

FIG. 8 illustrates an example of a flow diagram of the content provider 150. The system 100 may identify event objects based on a time frame, a location, or other criteria (802). For example, the system 100 may identify the event identifiers with based on a recent increase events objects being flagged as special events within a time frame of reference. In some examples, the system 100 may determine a large increase in the recent number energy metrics. The system 100 may load all of the event objects and/or activity objects based on the recent increase in energy metrics, such as the adjusted activity scores and/or the adjusted event scores.

The system 100 may then cycle through each of the event objects identified (804). Starting with a first event object, the system 100 may load flagged activity information for the event object. For example, the system 100 may load all of the activity identifiers associated with the event object (806). The system 100 may cycle through each of the activity identifiers (808). In other examples, the system 100 may load all of the activity objects at once.

The system 100 may load all of the activity information associated with the activity objects corresponding to the loaded activity identifiers (810). For example, the system 100 may acquire the activity context information, pre-processed photos, videos, audio, text summarization, metadata including scores, entities identified, and other activity data samples and/or information related to the activity data samples.

The system 100 may compile a title based on the loaded activity information (812). The system 100 may use templates and known patterns with the metadata and contextual information from the particular activity to compile the title for the particular activity and/or event. For example, the system 100 may evaluate the activity context information and determine a title based on an interpretation of the activity context information. In other examples, the system 100 may compile a title with topical indicators. In some example, the system 100 may include a database of predefined titles associated with previously titled activity information. The activity information may be compared with the previously titled activity information to determine the title.

In other examples, the patterns in the activity data samples may be identified and compared with previously defined patterns associated with the predefined titles.

The system 100 may additionally compile subtitles similar to the process previously stated (812). As above, the system 100 may use context of the activity and also known patterns and the particular templates defined to produce subtitles for the activity.

The system 100 may additionally compile an activity summary of the activities (814). As above, the system 100 may use the activity information, known patterns, and/or the particular templates defined to produce a summary for each activity object associated with an event. For example, the system 100 may compare the activity data samples with previously summarized activity context information. The previously summarized activity context information may be associated with predefined summaries. The predefined summaries may be selected based on a comparison between the activity information associated with the activity object and previously summarized activity context information.

In some examples, the system 100 may select specific information from the activity context information. For example, the system 100 may select top-rated photos (816). The system 100 may loop through photos included in the activity context information to select the most promising ones by using metadata, such as entities, sentiment, number of participants in photo, identified movement patterns, or other information analyzed by the system 100. For example, the system 100 may select the photos associated with the highest energy metrics, such as the highest weight factors and/or adjusted activity scores.

In addition, the system 100 may select top-rated videos (818). For example, the system 100 may process the videos included in the activity context information. For each video, the system 100 may extract flagged time intervals to extract 'best moments' and use templates and known patterns to compile a video summary.

The system 100 may synthesize an interactivity story (820). For example, the system 100 may use known patterns, rules and templates to create an optimal synthesis sequence of the selected photos, video summaries, packaged with titles, subtitles and summaries. In addition, the system 100 may also select a cover image, title, and sub-title. For example, the system 100 may add activity information and/or event information to a datafield of a template. The template may define predefined portions of the story and the datafield may be reserved variable portions of the summary. The predefined portions of the story and variable portions of the story may result in the story.

The system 100 may store the story data objects which include the story and any associated activity information and/or event information (822). The story data object may include be stored in any kind of predefined formation. For example, the story data object may be saved as a JSON object with links to other references information. Alternatively or in addition, the story object may be stored in a table in a database.

The system 100 may broadcast the stories over communication channels (824). For example, the system 100 may apply rules on which content to publish, how often and/or to which channel. In some examples, the system 100 may be configured to publish stories over specific communication channels. For example, the system 100 may be configured to associate a specific template with a communication channel such that all stories communicated over the communication channel are generated using the specific template. In other example, the system 100 may select specific communication channels based on topical indicators. In this example, the system 100 may associate the specific communication channels with specific topical indicators and communicate stories over the communication channel that were generated with activity information and/or event information that is associated with specific topical indicators.

Figure 9:
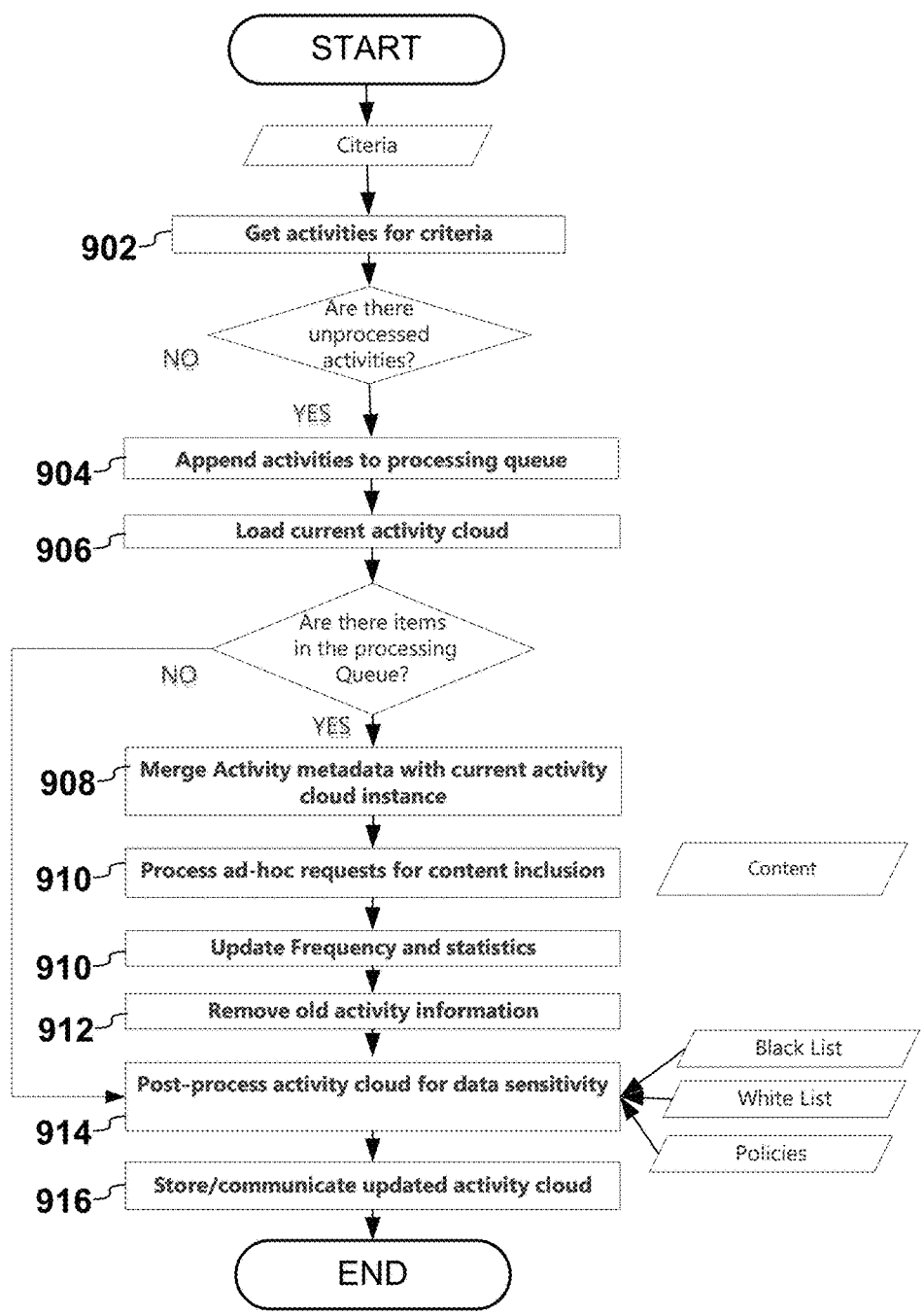
FIG. 9 illustrates a second example of a flow diagram of the content provider.

FIG. 9 illustrates a second example of a flow diagram of the content provider 150. The system 100 may retrieve all of the activity information, such as the activity identifiers, based on search criteria (902). The search criteria may include time intervals, locations in the organization where the activities are occurring, energy metrics, or any other aspect of the activity object as described herein.

For each activity identifier identified based on the search criteria, the system 100 may append the associated activity identifier and/or any additional activity information to a processing queue (904). In some examples, only relevant data, such as metadata, text, activity context information extracted, safety information, flags, activity scores, and/or any other information may be appended to the queue.

The system 100 may load a current activity cloud (906). Load the current instance of the activity cloud. The activity cloud may include a set of terms, product mentions, project mentions, technologies mentioned and phrases and any additional activity context information and/or metadata of the activity context information. The activity cloud may include real-time, or near real time activity data in the organization. For example, the activity cloud may include topics, images, audio clips, and other activity information. The activity information may be associated with an energy metric. The system 100 may further append information to the activity cloud (908). For example, the system 100 may traverse through each activity identifier in the processing queue. The system 100 may evaluate the activity data objects and/or activity context information associated with the activity identifier. The system 100 may include information from each the activity object in the activity cloud. For example, the system 100 may add activity context information, energy metrics, activity type identifiers, topical indicators, underlying activity data samples, and/or any other activity information. In some examples, the system 100 may search the activity data base to activity information that is similar to the activity context of the activity object identifier in the processing queue. In some examples, the system 100 may identify trends in the energy metrics for a time frame before and/or after a creation date of the activity object identifier in the processing queue. Based on the comparisons, the activity data samples, the activity context information, and/or the activity data samples that are identified are appended to the activity cloud.

The system 100 process ad-hoc requests for content inclusion (910). For example, users of the system 100 may explicitly add particular phrases, terms, product references etc. to be included in the Activity Cloud. In some examples, the references might include references and hyperlinks The system 100 may further update frequency and statistics of the activity information added to the activity cloud (911). For example, matched activity information may include a popularity score. For example, the activity context information and/or the activity object may be associated with the popularity score. The popularity score may be increased (reflecting how recent an item is in the activity cloud). The popularity score increases the impact of the activity information in the Activity Cloud (912). Old activity information may be removed from the activity cloud based on a popularity score and/or the associated energy metrics being below a predefined threshold.

The system 100 may further post-process the cloud for data sensitivity (914). For example, the system 100 may apply special rules and policies flagging particular activity information as appropriate or not for particular, predefined scenarios and use cases. For example, the system 100 may remove activity information that is included in the restricted content repository.

When all of the activity identifiers have been processed, the system 100 may store the updated activity cloud (916). The activity cloud may be stored as a table in a database. Alternatively or in addition, the activity cloud may be communicated. In some examples, the system 100 may maintain a version of the current activity cloud. The activity cloud may be broadcast in response to a change in the version.

The activity cloud may be provided to an external network, for example a social network. The activity cloud may be pushed automatically and/or pulled by request. The external network may display the activity information based on the energy metrics associated with the activity information. Alternatively, or in addition, the activity cloud may be formatted to match the programming interface requirements of the external network.

In one example, the activity cloud may be provided to a social network. The social network may provide webpage that includes the activity cloud. The webpage may include, for example, a word map of topics being discussed in the organization. The topics may be displayed in a font size proportionate to the energy metrics associated with the topic. For example, relatively higher energy metric associated with a topic may result in a relatively larger font for the topic displayed on the social network website. In another example, the website may display a series of images and/or videos that are associated energy metrics above a predefined threshold. In other examples, the website may display information from activity cloud that relates to a recent event such as an important meeting. The information may include the names of attendees to the meeting, a summary of the meeting, and images from important moments in the meeting. The important moments in the meeting may be further identified based on the energy metrics included in the activity cloud.

The logic illustrated in the flow diagrams may include additional, different, or fewer operations than illustrated. The operations illustrated may be performed in an order different than illustrated.

Figure 10:
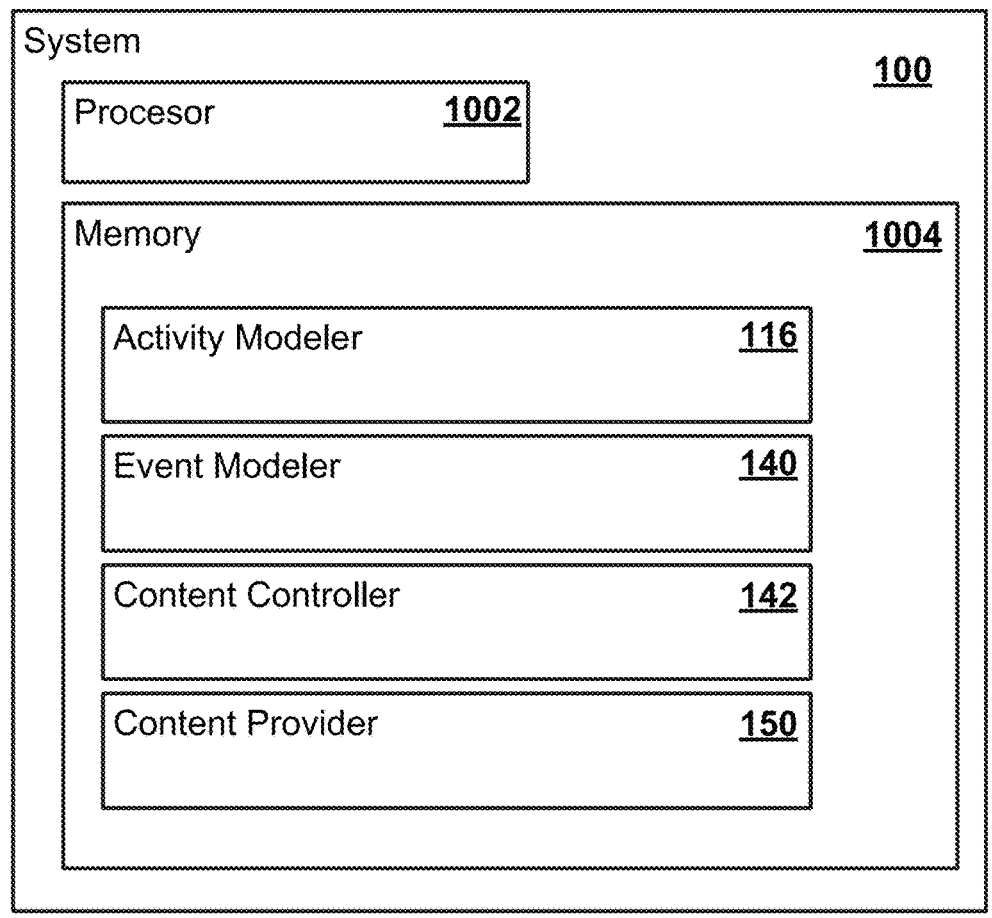
FIG. 10 illustrates an example of a system that includes a memory and a processor.

The system 100 may be implemented with additional, different, or fewer components than illustrated. For example, FIG. 10 illustrates an example of the system 100 that includes a memory 1004 and a processor 1002.

The processor 1002 may be in communication with the memory 1004. In one example, the processor 1002 may also be in communication with additional elements, such as a network interface (not shown). Examples of the processor 1002 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1002 may be one or more devices operable to execute logic. The logic may include computer executable instructions or computer code stored in the memory 1004 or in other memory that when executed by the processor 1002, cause the processor 1002 to perform the features implemented by the logic of the activity modeler 116, the event modeler 140, the content controller 142, the content provider 150 and/or the system 100. The computer code may include instructions executable with the processor 1002.

The memory 1004 may be any device for storing and retrieving data or any combination thereof. The memory 1004 may include non-volatile and/or volatile memory, such as a random access memory (RAM), a read-only memory (ROM), an erasable programmable read-only memory (EPROM), or flash memory. Alternatively or in addition, the memory 1004 may include an optical, magnetic (hard-drive) or any other form of data storage device.

The memory 1004 may include at least one the activity modeler 116, the event modeler 140, the content controller 142, and the content provider 150. In addition, the memory may include any other component previously discussed, such as the activity type classifier 202, the content identifier 204, the activity scorer 206, the story builder 402, the broadcaster 404, the API controller 406 and/or other components of the system 100 described herein.

The system 100 may be implemented in many different ways. For example each component of the system may include a circuit or circuitry. Each circuit or circuitry may be hardware or a combination of hardware and software. The circuitry may include the activity modeler 116, the event modeler 140, the content controller 142, and the content provider 150 and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1004, for example, that comprises instructions executable with the processor 1002 or other processor to implement one or more of the features of the circuitry. When any one of the circuitry includes the portion of the memory that comprises instructions executable with the processor 1002, the circuitry may or may not include the processor 1002. In some examples, each circuitry may just be the portion of the memory 1004 or other physical memory that comprises instructions executable with the processor 1002 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
    data acquisition controller circuitry to receive, from a plurality of collectors in a plurality of different independent locations in an organization, activity data samples comprising at least one of audio data, image data, machine data, or sensor data;
    activity type classifier circuitry to search a memory configured to store previously classified activity data samples associated with baseline activity scores and identify a baseline activity score for the activity data samples based on a comparison between the activity data samples and the previously classified activity data samples, the activity type classification circuitry further configured to link, in the memory, the baseline activity score with the activity data samples;
    content recognition circuitry configured to recognize activity context information in the activity data samples, the content recognition circuitry further configured to search the memory, the memory further configured to store an association between previously classified activity context information and predefined weight factors, the content recognition circuitry further configured to identify a weight factor based on a comparison between the activity context information and the previously classified activity context information;
    activity scoring circuitry configured to weight the baseline activity score with the weight factor to generate an adjusted activity score corresponding to the activity data samples;
    content controller circuitry configured to match the activity context information with restricted information stored in the memory and generate modified activity context information which excludes the restricted information;
    event modeler circuitry configured to calculate a variance score based on a comparison between the baseline activity score and the adjusted activity score; and
    content provider circuitry configured to communicate a message including at least one of the modified activity context information, the variance score, or the adjusted activity score.

2. The system of aspect 1, wherein the message comprises a plurality of adjusted activity scores and an identifier of each of the plurality of different independent locations, the plurality of adjusted activity scores including the adjusted activity score.

3. The system of any of aspects 1 to 2, wherein the message is responsive by a display interface to display a heat map of the organization, the heat map including a graphical representation of the plurality of different independent locations marked with colors, each of the colors corresponding to a respective adjusted activity score from the plurality of adjusted activity scores.

4. The system of any of aspects 1 to 3, wherein the organization comprises a building and the plurality of different independent locations comprise rooms within the building.

5. The system of any of aspects 1 to 4, wherein the content provider circuitry is further configured to control one or more building hardware devices based on the adjusted activity score.

6. The system of any of aspects 1 to 5, wherein the activity context information recognized in the activity data samples includes at least one of an image, a video, or an audio clip.

7. The system of any of aspects 1 to 6, wherein the activity context information includes an image, wherein the content controller circuitry is configured to modify a portion of the image included in the restricted information and retain a remainder of the image not included in the restricted information.

8. The system of any of aspects 1 to 7, wherein the event modeler circuitry is further configured to:
    receive a range of time,
    identify a plurality of baseline activity scores generated from the activity data samples received over the range of time,
    identify a plurality of adjusted activity scores generated from respective activity data samples received over the range of time, and
    calculate the variance score based on a comparison of the plurality of adjusted activity scores and the plurality of baseline activity scores.

9. A computer-implemented method, the computer-implemented method comprising:
    receiving, from data collectors in an organization, activity data samples comprising audio data and image data;
    classifying, by a processor, the activity data samples with an activity type identifier by searching a memory configured to store previously classified activity data samples associated with the activity type identifier and comparing the activity data samples with the previously classified activity data samples, the activity type identifier associated with a baseline activity score;
    recognizing, with a speech-to-text processor and an image recognition processor, activity context information included in the activity data samples;
    identifying, by the processor, a topical indicator which classifies the activity context information by comparing the activity context information with previously classified activity context information stored in the memory, the previously classified activity context information linked with a topical indicator and the topical indicator linked with a weight factor;

weighing, by the processor, the baseline activity score with the weight factor to generate an adjusted activity score;

securing, by the processor, the activity context information by comparing the activity context information to restricted activity context information included in a restricted content database and modifying the activity context information to generate modified activity context information which excludes the restricted activity context information; and communicating, by the processor, a message including the modified activity context information.

10. The computer-implemented method of aspect 9, further comprising the step of generating, by the processor, the message by combining the modified activity context information with a template comprising content arranged in a predefined format.

11. The computer-implemented method of any of aspects 9 to 10, further comprising selecting, by the processor, the template from a plurality of templates, each of the plurality of templates associated with a corresponding score range, the adjusted activity score being within the corresponding score range of the template.

12. The computer-implemented method of any of aspects 9 to 11, further comprising:

identifying, by the processor, a predefined metric associated a the datafield of the template, the datafield comprising a placeholder for variable content;

selecting, by the processor, the modified information based on a comparison between the predefined metric and the adjusted activity score.

13. The computer-implemented method of any of aspects 9 to 12, further comprising:

identifying, in a memory, a plurality of activity identifiers, each activity identifier linked with respective adjusted activity scores and respective activity context information.

14. The computer-implemented method of any of aspects 9 to 13, further comprising:

identifying, by the processor, a trend in the respective adjusted activity scores corresponding to the plurality of activity identifiers; and communicating the message in response to the trend.

15. The computer-implemented method of any of aspects 9 to 14, further comprising:

comparing, by the processor, the trend of the respective adjusted activity scores to predefined trends linked with respective templates and identifying a template from the respective templates based on a comparison of the trend with the predefined trends; and generating, by the processor, the message by adding the modified activity context information to a datafield of the template, wherein the templates comprises content arranged in a predefined format.

16. A computer readable storage medium that is non-transitory comprising computer executable instructions, the computer executable instructions executable by a processor, the computer executable instructions comprising:

instructions executable to receive, from a plurality of collectors in a plurality of different independent locations in an organization, activity data samples comprising at least one of audio data, image data, or machine data;

instructions executable to search a memory configured to store previously classified activity data samples associated with respective activity types and identify activity type identifiers for the activity data samples based on a comparison between the activity data samples and the previously classified activity data samples, the activity type identifiers assigned a corresponding baseline activity score;

instructions executable recognize data patterns in the activity data samples and search a repository configured to store an association between topical indicators and the data patterns, each of the topical indicators assigned a corresponding weight factor;

instructions executable to weight a respective baseline activity score of each of the activity type identifiers with a respective weight factor of each of the topical indicators to generate activity scores;

instructions executable to generate an event score based on the respective baseline activity score of each of the activity type identifiers being weighted with the respective weight factor of each of the topical indicators; and instructions executable to communicate a message including activity information descriptive of the activity data samples in response to the event score being greater than a predefined threshold.

17. The computer readable storage medium of aspect 17, wherein the instructions executable to generate the event score further comprise:

instructions executable by the processor to weight the respective baseline activity score of each of the activity type identifiers with the respective weight factor of each of the topical indicators to generate the event score.

18. The computer readable storage medium of any of aspects 16 to 17, wherein the instructions executable to generate the event score further comprise:

instructions executable by the processor to receive a notification registration, the notification registration including a requested topical indicator and a requested template identifier;

instructions executable by the processor to identify a template in response to the template identifier matching the requested template identifier;

instructions executable by the processor to arrange the activity data samples according to the template and generate formatted activity information based on the arranged activity data samples; and instructions executable to communicate the formatted activity information in response to the event score being greater than a predefined threshold and the requested topical indicator of the notification registration being included in the topical indicators.

19. The computer readable storage medium of any of aspects 16 to 18, wherein the notification registration further includes a requested communication channel identifier and the communication channel is selected from a group of communication channels based on the requested communication channel identifier of the notification registration.

20. The computer readable storage medium of any of aspects 16 to 19, wherein the notification registration further includes a requested predefined threshold, wherein the predefined threshold is determined based on the requested predefined threshold.

21. The computer readable storage medium of any of aspects 16 to 20, further comprising:

instructions executable by the processor to determine if each of the topical indicators are included in a permissive content repository comprising a plurality of permitted topical indicators; and instructions executable by the processor to permit communication of the formatted activity information in response to each of the topical indicators being included in the permissive content repository.

What is claimed is:

1. A system comprising:
    data acquisition controller circuitry to receive, from a plurality of collectors in a plurality of different independent locations in an organization, activity data samples comprising at least one of audio data, image data, machine data, or sensor data;
    activity type classifier circuitry to search a memory configured to store previously classified activity data samples associated with baseline activity scores and identify a baseline activity score for the activity data samples based on a comparison between the activity data samples and the previously classified activity data samples, the activity type classification circuitry further configured to link, in the memory, the baseline activity score with the activity data samples;
    content recognition circuitry configured to recognize activity context information in the activity data samples, the content recognition circuitry further configured to search the memory, the memory further configured to store an association between previously classified activity context information and predefined weight factors, the content recognition circuitry further configured to identify a weight factor based on a comparison between the activity context information and the previously classified activity context information;
    activity scoring circuitry configured to weight the baseline activity score with the weight factor to generate an adjusted activity score corresponding to the activity data samples;
    content controller circuitry configured to match an image included in the activity context information with restricted information stored in the memory and generate modified activity context information which excludes the restricted information, wherein to generate the modified activity context information, the controller circuitry is further configured to modify a first portion of the image that corresponds to the restricted information and retain a second portion of the image that does not correspond to the restricted information;
    event modeler circuitry configured to calculate a variance score based on a comparison between the baseline activity score and the adjusted activity score; and
    content provider circuitry configured to control, based on the calculated variance score, communication of a message including the modified activity context information, wherein to control communication of the message, the content provider circuitry is configured to permit communication of the message in response to the variance score being greater than a threshold value.

2. The system of claim 1, wherein the message comprises a plurality of adjusted activity scores and an identifier of each of the plurality of different independent locations, the plurality of adjusted activity scores including the adjusted activity score.

3. The system of claim 2, wherein the message is responsive by a display interface to display a heat map of the organization, the heat map including a graphical representation of the plurality of different independent locations marked with colors, each of the colors corresponding to a respective adjusted activity score from the plurality of adjusted activity scores.

4. The system of claim 1, wherein the organization comprises a building and the plurality of different independent locations comprise rooms within the building.

5. The system of claim 1, wherein the content provider circuitry is further configured to control one or more building hardware devices based on the adjusted activity score.

6. The system of claim 1, wherein the activity context information recognized in the activity data samples includes at least one of an image, a video, or an audio clip.

7. The system of claim 1, wherein the event modeler circuitry is further configured to:
    receive a range of time,
    identify a plurality of baseline activity scores generated from the activity data samples received over the range of time,
    identify a plurality of adjusted activity scores generated from respective activity data samples received over the range of time, and
    calculate the variance score based on a comparison of the plurality of adjusted activity scores and the plurality of baseline activity scores.

8. A computer-implemented method, the computer-implemented method comprising:
    receiving, from data collectors in an organization, activity data samples comprising audio data and image data;
    classifying, by a processor, the activity data samples with an activity type identifier by searching a memory configured to store previously classified activity data samples associated with the activity type identifier and comparing the activity data samples with the previously classified activity data samples, the activity type identifier associated with a baseline activity score;
    recognizing, with a speech-to-text processor and an image recognition processor, activity context information included in the activity data samples;
    identifying, by the processor, a topical indicator which classifies the activity context information by comparing the activity context information with previously classified activity context information stored in the memory, the previously classified activity context information linked with a topical indicator and the topical indicator linked with a weight factor;
    weighing, by the processor, the baseline activity score with the weight factor to generate an adjusted activity score;
    securing, by the processor, the activity context information by comparing the activity context information to restricted activity context information included in a restricted content database and modifying the activity context information to generate modified activity context information which excludes the restricted activity context information;
    selecting, by the processor, a template from a plurality of templates, the template comprising content arranged in a predefined format, each of the plurality of templates associated with a corresponding score range, the adjusted activity score being within the corresponding score range of the template;
    generating, by the processor, a message based on combination of the modified activity context information and the template, the message configured to control a building hardware device; and
    controlling, by the processor, the building hardware device based on the message.

9. The computer-implemented method of claim 8, further comprising:
    identifying, by the processor, a predefined metric associated with a datafield of the template, the datafield comprising a placeholder for variable content; and selecting, by the processor, the datafield based on a comparison between the predefined metric and the adjusted activity score.

10. The computer-implemented method of claim 8, further comprising: identifying, in a memory, a plurality of activity identifiers, each activity identifier linked with respective adjusted activity scores and respective activity context information.

11. The computer-implemented method of claim 10, further comprising:
identifying, by the processor, a trend in the respective adjusted activity scores corresponding to the plurality of activity identifiers; and
communicating the message in response to the trend.

12. The computer-implemented method of claim 11, further comprising:
comparing, by the processor, the trend of the respective adjusted activity scores to predefined trends linked with the templates, wherein selecting the template further comprises identifying the template from the templates based on a comparison of the trend with the predefined trends.

13. A computer-implemented method, the computer-implemented method comprising:
receiving, from data collectors in an organization, activity data samples comprising audio data and image data;
classifying, by a processor, the activity data samples with an activity type identifier by searching a memory configured to store previously classified activity data samples associated with the activity type identifier and comparing the activity data samples with the previously classified activity data samples, the activity type identifier associated with a baseline activity score;
recognizing, with a speech-to-text processor and an image recognition processor, activity context information included in the activity data samples;
identifying, by the processor, a topical indicator which classifies the activity context information by comparing the activity context information with previously classified activity context information stored in the memory, the previously classified activity context information linked with a topical indicator and the topical indicator linked with a weight factor;
weighing, by the processor, the baseline activity score with the weight factor to generate an adjusted activity score;
securing, by the processor, the activity context information by comparing the activity context information to restricted activity context information included in a restricted content database and modifying the activity context information to generate modified activity context information which excludes the restricted activity context information;
receiving a notification registration, the notification registration comprising a communication channel identifier and a template identifier, the communication channel identifier associated with a communication channel and the template identifier associated with a template; and
controlling communication of the activity context information by:
identifying, by the processor, predefined metrics respectively associated with datafields of the template, each of the datafields comprising a corresponding placeholder for variable content,
selecting, by the processor, at least one of the datafields based on a comparison between the predefined metrics and the adjusted activity score,
generating, by the processor, a message based on combination of the modified activity context information and the at least one of the datafields, and
communicating the message over a communication channel corresponding to the communication channel identifier.

14. A computer-implemented method, the computer-implemented method comprising:
receiving, from data collectors in an organization, activity data samples comprising audio data and image data;
classifying, by a processor, the activity data samples with activity type identifiers by searching a memory configured to store previously classified activity data samples associated with the activity type identifiers and comparing the activity data samples with the previously classified activity data samples, the activity type identifiers associated with respective baseline activity scores;
recognizing, with a speech-to-text processor and an image recognition processor, activity context information included in the activity data samples;
identifying, by the processor, topical indicators which classifies the activity context information by comparing the activity context information with previously classified activity context information stored in the memory, the previously classified activity context information linked with the topical indicators and the topical indicators linked with respective weight factors;
weighing, by the processor, the respective baseline activity scores with the respective weight factors to generate respective adjusted activity scores; and
controlling, by the processor, based on the respective adjusted activity scores, communication of the activity context information by:
securing, by the processor, the activity context information by comparing the activity context information to restricted activity context information included in a restricted content database and modifying the activity context information to generate modified activity context information which excludes the restricted activity context information,
identifying, in a memory, a plurality of activity identifiers, the activity identifier linked with the respective adjusted activity scores and the activity context information,
identifying, by the processor, a trend in the respective adjusted activity scores corresponding to the plurality of activity identifiers,
comparing, by the processor, the trend in the respective adjusted activity scores to predefined trends linked with respective templates,
selecting, by the processor, a template from the respective templates based on a comparison of the trend with the predefined trends, wherein the template comprises content arranged in a predefined format,
generating, by the processor, a message by adding the modified activity context information to a datafield of the template, and
performing, by the processor, communication of the message including the modified activity context information arranged in the predefined format of the template.

* * * * *